US012608168B2

(12) United States Patent
Nakamura et al.

(10) Patent No.: US 12,608,168 B2
(45) Date of Patent: Apr. 21, 2026

(54) ELECTRONIC DEVICE, CONTROL METHOD FOR ELECTRONIC DEVICE, COMPUTER PROGRAM, AND STORAGE MEDIUM

(71) Applicant: Panasonic Intellectual Property Management Co., Ltd., Osaka (JP)

(72) Inventors: Yusaku Nakamura, Osaka (JP); Mitsuhiro Kizu, Hyogo (JP); Takuya Yasunaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/933,125

(22) Filed: Oct. 31, 2024

(65) Prior Publication Data

US 2025/0060923 A1 Feb. 20, 2025

Related U.S. Application Data

(63) Continuation of application No. PCT/JP2023/015748, filed on Apr. 20, 2023.

(30) Foreign Application Priority Data

Jul. 29, 2022 (JP) ................................ 2022-121893

(51) Int. Cl.
G06F 3/00 (2006.01)
G06F 1/3234 (2019.01)
(Continued)

(52) U.S. Cl.
CPC .............. G06F 3/14 (2013.01); G06F 1/3265 (2013.01); G06T 3/40 (2013.01)

(58) Field of Classification Search
CPC . G06F 1/3265; G06F 3/01; G06F 3/14; G06T 3/40; G09G 5/00; G09G 5/10;
(Continued)

(56) References Cited

U.S. PATENT DOCUMENTS 8,443,297 B1 5/2013 Jitkoff et al.
2005/0160302 A1 7/2005 Asakura et al.
(Continued)

FOREIGN PATENT DOCUMENTS

CN 101661326 A 3/2010
CN 103943052 A 7/2014
(Continued)

OTHER PUBLICATIONS

International Search Report issued Jun. 27, 2023 in corresponding International Application No. PCT/JP2023/015748.
(Continued)

*Primary Examiner* — Insa Sadio
(74) *Attorney, Agent, or Firm* — Wenderoth, Lind & Ponack, L.L.P.

(57) ABSTRACT

An electronic device according to one aspect of the present disclosure includes: a display that displays at least one window of at least one application; and a controller that controls the display. The controller acquires first trigger information for starting power saving processing, and starts the power saving processing based on the first trigger information. The controller, in an example of the power saving processing, acquires a still image based on the screen of the display, displays the still image on the display, and minimizes the size of at least one window while the still image is being displayed.

19 Claims, 17 Drawing Sheets

5 0

5 2

(51) Int. Cl.
    *G06F 3/14*           (2006.01)
    *G06T 3/40*           (2006.01)

(58) Field of Classification Search
    CPC .. G09G 5/14; G09G 5/36; G09G 5/37; G09G
                        5/373
    See application file for complete search history.

(56)                   References Cited

U.S. PATENT DOCUMENTS

| | | |
|---|---|---|
| 2006/0164435 A1 | 7/2006 | Tsunoda |
| 2014/0204064 A1* | 7/2014 | Chen ........................ G09G 5/18 |
| | | 345/204 |
| 2020/0226982 A1* | 7/2020 | Tung ................... G09G 3/3275 |

FOREIGN PATENT DOCUMENTS

| | | |
|---|---|---|
| JP | 2001-117693 | 4/2001 |
| JP | 2002-99369 | 4/2002 |
| JP | 2005-202750 | 7/2005 |

OTHER PUBLICATIONS

International Preliminary Report on Patentability issued Feb. 13, 2025 in corresponding International Application No. PCT/JP2023/015748.
Office Action issued Aug. 5, 2025 in corresponding Japanese Patent Application No. 2022-121893, with English translation.
Office Action issued Feb. 5, 2026 in corresponding Chinese patent application No. 202380036868.4, 21 pages.

\* cited by examiner

Fig. 2B

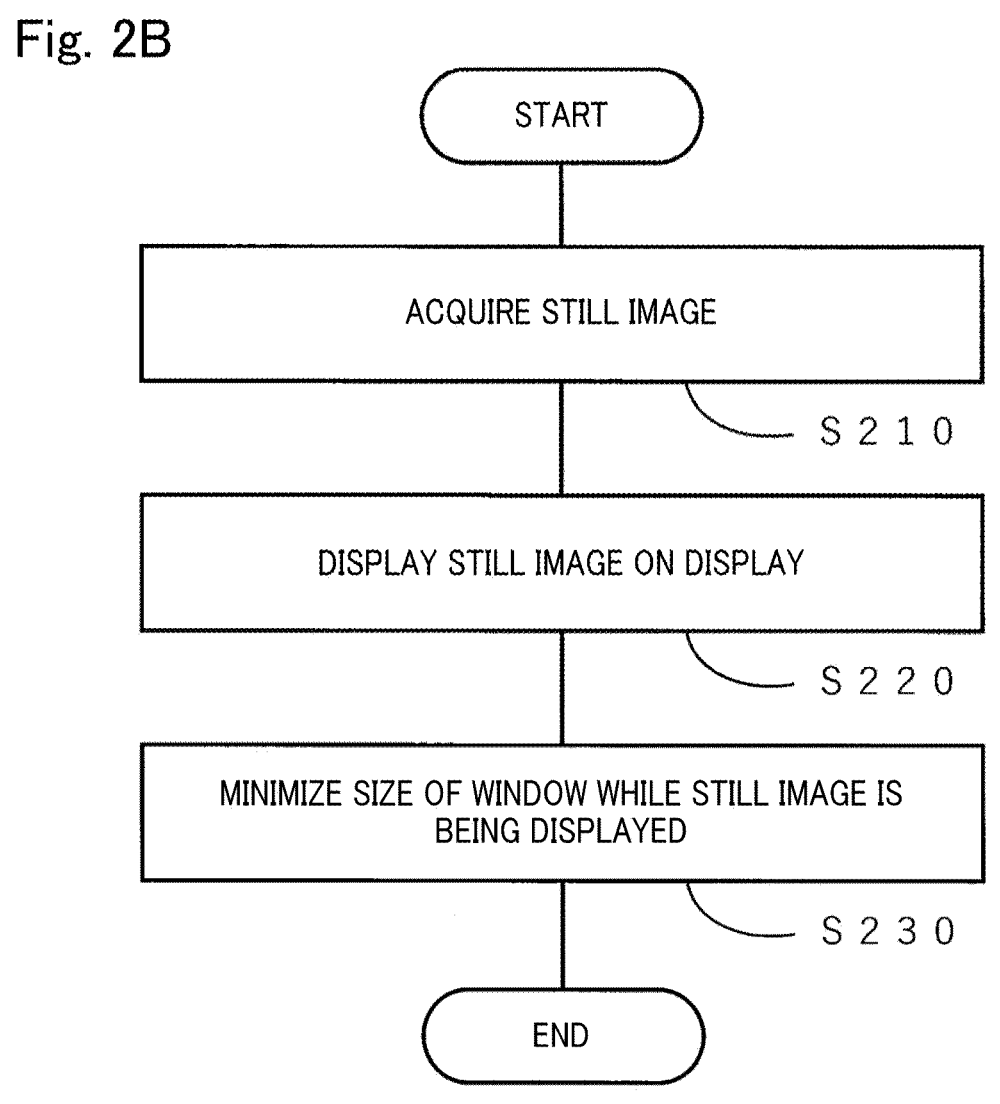

```
        ┌─────────────┐
        │    START    │
        └──────┬──────┘
               │
   ┌───────────────────────────┐
   │    ACQUIRE STILL IMAGE     │
   └───────────┬───────────────┘
               │        S 2 1 0
               │
   ┌───────────────────────────┐
   │ DISPLAY STILL IMAGE ON DISPLAY │
   └───────────┬───────────────┘
               │        S 2 2 0
               │
   ┌───────────────────────────┐
   │ MINIMIZE SIZE OF WINDOW WHILE STILL IMAGE IS │
   │        BEING DISPLAYED        │
   └───────────┬───────────────┘
               │        S 2 3 0
               │
        ┌─────────────┐
        │     END     │
        └─────────────┘
```

5 0

5 2

6 0

6 2

6 5

6 4

6 6

START

RESTORE SIZE OF WINDOW HAVING BEEN MINIMIZED TO SIZE
BEFORE POWER SAVING PROCESSING HAS BEEN STARTED

S310

UNDISPLAY STILL IMAGE

S320

END

START

REDUCE SIZE OF WINDOW OF APPLICATION BEING
DISPLAYED ON DISPLAY OF ELECTRONIC DEVICE

S230A

END 5 6

START

ACQUIRE STILL IMAGE

S 2 1 0

DISPLAY STILL IMAGE ON DISPLAY

S 2 2 0

REDUCE SIZE OF WINDOW WHILE STILL IMAGE IS BEING DISPLAYED

S 2 3 0 A

END

ELECTRONIC DEVICE, CONTROL METHOD FOR ELECTRONIC DEVICE, COMPUTER PROGRAM, AND STORAGE MEDIUM

CROSS REFERENCE TO RELATED APPLICATION

This is a continuation application of International Application No. PCT/JP2023/015748 with an international filing date of Apr. 20, 2023, which claims priority of Japanese Patent Application No. 2023-121893 filed on Jul. 29, 2022, the content of which is incorporated herein by reference.

BACKGROUND

Technical Field

The present disclosure relates to an electronic device, a control method for an electronic device, a computer program, and a storage medium.

Background Art

Usable time of an electronic device that receives driving power from a battery is largely dependent on the power consumed while the electronic device is in use. The usable time of the electronic device can be extended by suppressing power consumption. JP 2005-202750 A describes a technique for reducing the power consumption of a display. The computer described in JP 2005-202750 A suppresses the power consumption by generating a black full-screen window, and displaying an active window in front of the black full-screen window.

However, the technique described in JP 2005-202750 A still has room for improvement in terms of power saving.

SUMMARY

An object of the present disclosure is to provide an electronic device, a control method for an electronic device, a computer program, and a storage medium capable of achieving power saving while the electronic device is in use.

In order to address the issue described above, the present disclosure provides an electronic device, a control method for an electronic device, a computer program, and a storage medium.

An electronic device according to one aspect of the present disclosure includes: a display that displays at least one window of at least one application; and a controller that controls the display. The controller acquires first trigger information for starting power saving processing, and starts the power saving processing based on the first trigger information. In the power saving processing, the controller acquires a still image based on the screen of the display, displays the still image on the display, and minimizes the size of at least one window while the still image is being displayed.

In addition, an electronic device according to another aspect of the present disclosure includes a display that displays at least one window of at least one application, and a controller that controls the display. The controller acquires first trigger information for starting the power saving processing, and starts the power saving processing based on the first trigger information. In the power saving processing, the controller reduces the size of the at least one window.

In addition, a control method for an electronic device according to another aspect of the present disclosure includes: a step of acquiring first trigger information for starting power saving processing; and a step of starting the power saving processing based on the acquired first trigger information. The power saving processing includes a step of acquiring a still image based on a screen of the display, a step of displaying the still image on the display, and a step of minimizing the size of at least one window of at least one application while the still image is being displayed.

In addition, a control method for an electronic device according to another aspect of the present disclosure includes: a step of acquiring first trigger information for starting power saving processing; and a step of starting the power saving processing based on the acquired first trigger information. The power saving processing includes a step of reducing the size of at least one window of at least one application being displayed on the display of the electronic device.

A computer program according to another aspect of the present disclosure is a computer program for causing an electronic device to execute the control method described above.

Furthermore, a storage medium according to another aspect of the present disclosure is a non-transitory computer-readable storage medium in which a computer program is stored. By causing the processor to execute the computer program, the control method described above is implemented.

With the electronic device, the control method for an electronic device, the computer program, and the storage medium according to the present disclosure, it is possible to achieve power saving during the time in which the electronic device is in use.

BRIEF DESCRIPTION OF THE DRAWINGS

FIG. 2B is a flowchart of an example of power saving processing in the first embodiment.

DETAILED DESCRIPTION

Figure 1:
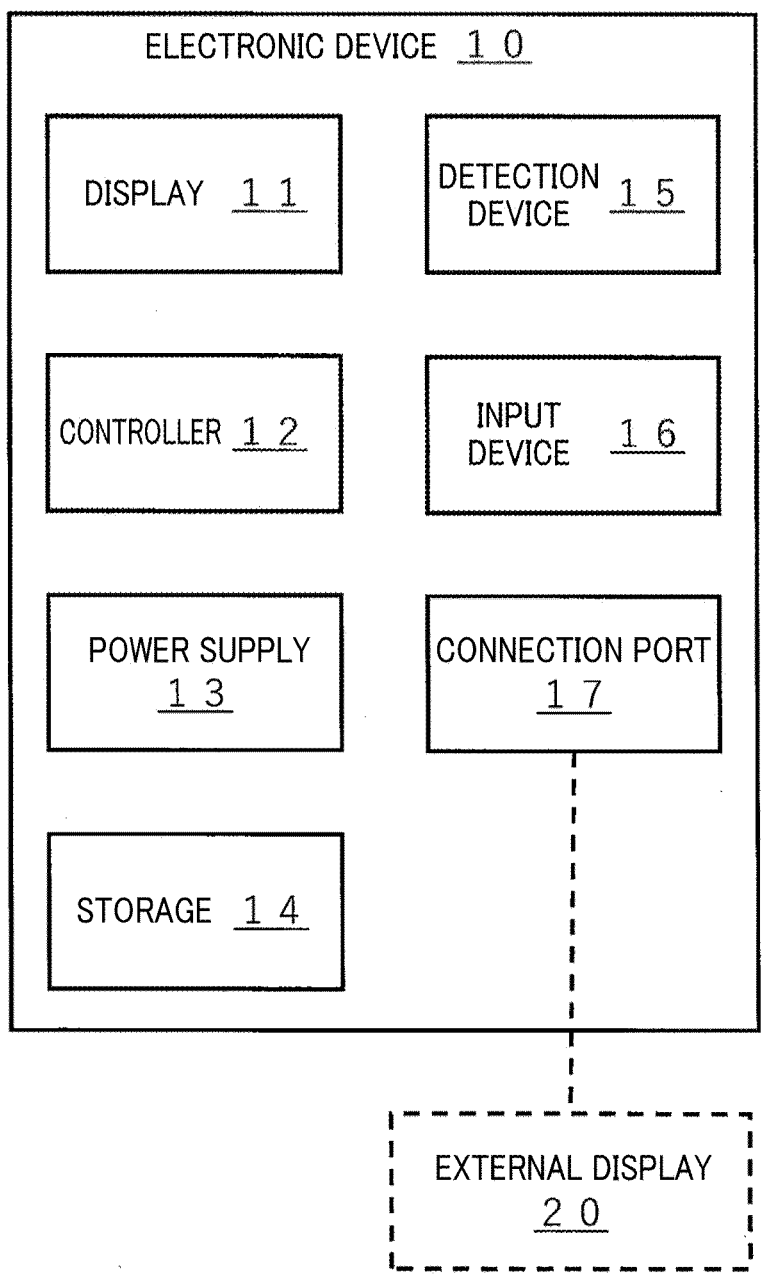
FIG. 1 is an example of a block diagram illustrating a configuration of an electronic device according to a first embodiment.

To begin with, various aspects of an electronic device, a control method for an electronic device, a computer program, and a storage medium will be described.

An electronic device according to a first aspect of the present disclosure includes: a display that displays at least one window of at least one application; and a controller that controls the display. The controller acquires first trigger information for starting power saving processing, and starts the power saving processing based on the first trigger information. In the power saving processing, the controller acquires a still image based on the screen of the display, displays the still image on the display, and minimizes the size of at least one window while the still image is being displayed.

With such a configuration, power saving processing can be performed while the electronic device is in use. In the power saving processing, because the size of the window is minimized, the processing for displaying the application corresponding to the window can be omitted, and therefore, power saving can be achieved in the electronic device. Furthermore, in the power saving processing, because the still image is displayed before the window is minimized in the background of the still image, it is possible to suppress flickering of the screen while the window is being minimized.

In an electronic device according to a second aspect of the present disclosure, in the first aspect, the first trigger information may be information indicating that a line of sight of a user is directed outside of the display, that the user is not in front of the display, or the user has entered a specific command.

With such trigger information, it is possible to trigger and to execute the power saving processing automatically when the user's line of sight is not directed to the display or when the user is not in front of the display, for example. The power saving processing can also be executed in response to a user's command. With such trigger information, the power saving processing is automatically started while the electronic device is not being used by the user, so that the usability of the electronic device can be improved.

In an electronic device according to a third aspect of the present disclosure, in the first aspect or the second aspect, the controller may further acquire second trigger information for cancelling the power saving processing, and may start restoring processing for cancelling the power saving processing on the basis of the second trigger information. In the restoring processing, the controller may restore the size of the at least one window having been minimized to the size before the power saving processing has been started, and undisplay the still image.

With this configuration, the power saving processing can be cancelled automatically or manually. In addition, in the restoring processing, because the still image is undisplayed after the size of the window is restored, it is also possible to suppress flickering of the screen when the size of the window is restored.

In the electronic device according to a fourth aspect of the present disclosure, in the third aspect, in the power saving processing, the controller may further lower the luminance of the display before displaying the still image on the display. In the restoring processing, the controller may further restore the luminance of the display to the luminance before the power saving processing has been started, after the still image is undisplayed.

By lowering the luminance of the display in the power saving processing, it is possible to achieve further power saving in the electronic device.

In the electronic device according to a fifth aspect of the present disclosure, in the third aspect or the fourth aspect, the electronic device may further include an input device. In the power saving processing, the controller may further disable the input device before displaying the still image on the display. In the restoring processing, the controller may further enable the input device after undisplaying the still image.

By disabling the input device by the power saving processing, further power saving can be achieved in the electronic device.

In the electronic device according to a sixth aspect of the present disclosure, in any one of the first to fifth aspects, the still image may be a screenshot captured before minimizing the size of the at least one window, an image obtained by blurring the screenshot, or a pre-stored image.

With such a still image, it is possible to suppress flickering while the size of the window is being changed. Furthermore, it is also possible to improve the security of the electronic device while the user is not in front of the electronic device, for example.

In an electronic device according to a seventh aspect of the present disclosure, in any one of the first to sixth aspects, the application may be an application that performs image processing in real time. Alternatively, the application may be an application having a configuration consuming less power during execution with the window minimized, than a predetermined threshold for a power consumption during execution without the window minimized.

The electronic device, the control method for an electronic device, and the like according to the present disclosure is particularly suitable for such an application, because a relatively large amount of power saving can be achieved by minimizing the size of the corresponding window.

An electronic device according to an eighth aspect of the present disclosure includes: a display that displays at least one window of at least one application; and a controller that controls the display. The controller acquires first trigger information for starting power saving processing, and starts the power saving processing based on the first trigger information. In the power saving processing, the controller reduces the size of at least one window.

With such a configuration, power saving processing can be performed while the electronic device is in use. Because the size of the window is reduced in the power saving processing, an area to be displayed on the basis of the application corresponding to the window is reduced. The amount of calculation for displaying the window is therefore reduced, so that power saving can be achieved in the electronic device.

In an electronic device according to a ninth aspect of the present disclosure, in the eighth aspect, the first trigger information may be information indicating that a line of sight of a user is directed outside of the display, that the user is not in front of the display, or the user has entered a specific command.

An electronic device according to a tenth aspect of the present disclosure includes: a display that displays at least one window of at least one application; and a controller that controls the display. The controller acquires first trigger information for starting power saving processing, and starts the power saving processing based on the first trigger information. In the power saving processing, the controller acquires a still image based on the screen of the display, displays the still image on the display, and reduces a size of the at least one window while the still image is being displayed.

With such a configuration, in the power saving processing, because the still image is displayed and then the window size is reduced in the background of the still image, it is possible to suppress flickering of the screen while the window size is being reduced.

In an electronic device according to an eleventh aspect of the present disclosure, in the tenth aspect, the first trigger information may be information indicating that a line of sight of a user is directed outside of the display, that the user is not in front of the display, or the user has entered a specific command.

A control method for an electronic device according to a twelfth aspect of the present disclosure includes: a step of acquiring first trigger information for starting power saving processing; and a step of starting the power saving processing based on the acquired first trigger information. The power saving processing includes a step of acquiring a still image based on a screen of a display of the electronic device, a step of displaying the still image on the display, and a step of minimizing the size of at least one window of at least one application while the still image is being displayed.

A control method for an electronic device according to a thirteenth aspect of the present disclosure includes: a step of acquiring first trigger information for starting power saving processing; and a step of starting the power saving processing based on the acquired first trigger information. The power saving processing includes a step of reducing the size of at least one window of at least one application being displayed on the display of the electronic device.

A computer program according to a fourteenth aspect of the present disclosure is a computer program for causing an electronic device to execute the control method according to the twelfth or thirteenth aspect.

A storage medium according to a fifteenth aspect according to the present disclosure is a non-transitory computer-readable storage medium in which a computer program is stored. The control method according to the twelfth or thirteenth aspect is implemented when the computer program is executed by a processor.

With the control method, the computer program, or the recording medium as recited in the twelfth to fifteenth aspects, it is possible to perform power saving processing while the electronic device is in use. In the power saving processing, because the size of the window is minimized or reduced, the processing for displaying the application corresponding to the window can be omitted, and therefore, power saving can be achieved in the electronic device.

Technical Concept

Before describing a specific embodiment of an electronic device, a control method for an electronic device, a computer program, and a storage medium according to the present disclosure, to begin with, a technical concept described in the present disclosure will be explained reference to an example. In this example, the electronic device includes a display and a controller. The controller executes an operating system (OS) having a window system, to control the display. The controller causes the display to display at least one window of at least one application, under the window system.

The controller of the electronic device acquires first trigger information for starting power saving processing, and starts the power saving processing based on the acquired first trigger information. For example, upon acquiring the first trigger information indicating that the user is not looking at the display for a predetermined time period, the controller automatically starts the power saving processing. In the power saving processing, the controller minimizes or reduces the size of at least one currently open window. In this manner, because at least the processing for displaying the application corresponding to the minimized or reduced window on the screen is reduced, it is possible to achieve power saving in the electronic device.

Each of the embodiments described below provides one example of the present disclosure. Numerical values, shapes, configurations, steps, an order of steps, and the like described in each of the following embodiments are merely examples, and are not intended to limit the present disclosure in any way. Among elements described in the first embodiment below, those not recited in independent claims defining the highest-level concepts are explained as optional elements.

Each of the following embodiments may include descriptions of modifications of some elements, and, for the other elements, any configuration may be combined therewith. Such combinations still fall within the scope of the embodiments, and their respective advantageous effects are achieved thereby. By combining the embodiments with the configurations of the respective modifications, advantageous effects achieved by the respective modifications are achieved.

In the following detailed description, the terms "first," "second," and the like are only used for the purpose of description, and should be understood neither as an explicit description nor as an implication of relative importance or ranks of the technical features. Limitations such as the "first" and the "second" indicate, explicitly or implicitly, one or more of such features are included.

First Embodiment

A first embodiment of an electronic device, a control method for an electronic device, a computer program, and a storage medium according to the present disclosure will now be described in detail with reference to the drawings, as appropriate.

<Overall Configuration>

FIG. 1 is an example of a block diagram illustrating a configuration of an electronic device 10 according to the first embodiment.

<Electronic Device 10>

As illustrated in FIG. 1, the electronic device 10 includes a display 11 and a controller 12 that controls the display 11. The electronic device 10 may be, for example, a laptop computer including a notebook computer, a tablet terminal, or a smartphone. In one example, the electronic device 10 further includes a power supply 13. The power supply 13 supplies power for allowing the electronic device 10 to operate, using a built-in battery, a removable battery, or an external power supply as a driving power source. The electronic device 10 may include a storage 14 that is a recording medium for recording various types of information and control programs. The electronic device 10 may also include at least one detection device 15 and/or input device 16, as appropriate, depending on the application thereof.

<Display 11>

The display 11 is a device capable of displaying a graphical user interface (GUI) including a window, on the basis of an operating system. The display 11 may be, for example, a display using a self-light emitting element such as an organic EL, or a display using an LCD or a CRT.

<Controller 12>

The controller 12 is a controller for controlling the entire electronic device 10. The controller 12 includes a general-purpose processor such as a CPU or an MPU configured to implement a predetermined function by executing a program stored in the storage 14. The controller 12 implements various types of control in the electronic device 10 by calling and executing a control program based on a control method. The controller 12 is not limited to one implementing a predetermined function through the cooperation of hardware and software, and may be a hardware circuit exclusively designed for implementing a predetermined function. That is, various types of a processor such as a CPU, an MPU, a GPU, an FPGA, a DSP, and an ASIC may be used to implement the controller 12.

The controller 12 executes an OS having a window system, and the display 11 displays a window under the control of the controller 12. For example, the controller 12 may execute an OS such as Windows (registered trademark), Unix (registered trademark), macOS (registered trademark), iOS (registered trademark), or Android (registered trademark). The controller 12 displays a GUI on the display 11, under the window system. The controller 12 may display a GUI using an overlapping window system or a tiling window system on the display 11. With the overlapping window system, rectangular windows are displayed in an overlapping manner, in the sizes and the positions as designated, within the screen. In the tiling window system, the screen is divided into at least one region using a border line, and each window is allocated to a region and displayed in such a manner no window overlaps each other.

The controller 12 can open a plurality of windows, and execute the corresponding applications, simultaneously. In the present disclosure, an open window refers to a window not minimized, and is visible in at least a part of a desktop, unless another window is displayed on top of such a window. An open window includes both of an active window (also referred to as a foreground window) and an inactive window. The active window refers to the window positioned foremost and entirely visible on the screen, and currently being operated by a user. An inactive window refers to a window other than an active window, among the open windows.

The controller 12 can minimize any open window using an application programming interface (API) of the OS. The minimized window is stored in a dedicated area in the desktop (e.g., the "task bar" in Windows (registered trademark) or the "Dock" in macOS (registered trademark)), as an icon or a button, for example. The minimized window can be resized to the original size at any time because the application corresponding thereto keeps the window running, unlike the closed window.

The controller 12 can acquire the first trigger information for starting the power saving processing, and start the power saving processing based on the acquired first trigger information. In the power saving processing, the controller 12 can also minimize the size of at least one window that is currently open, and display a screen with the minimized window on the display 11.

<Storage 14>

The storage 14 is a recording medium that records various types of information and control programs, and may be a memory serving as a working area of the controller 12. The storage 14 is implemented by, for example, a flash memory, a RAM, a solid state device (SSD), a hard disk, other types of storage device, or an appropriate combination thereof.

<Control Method for Electronic Device 10>

Figure 2A:
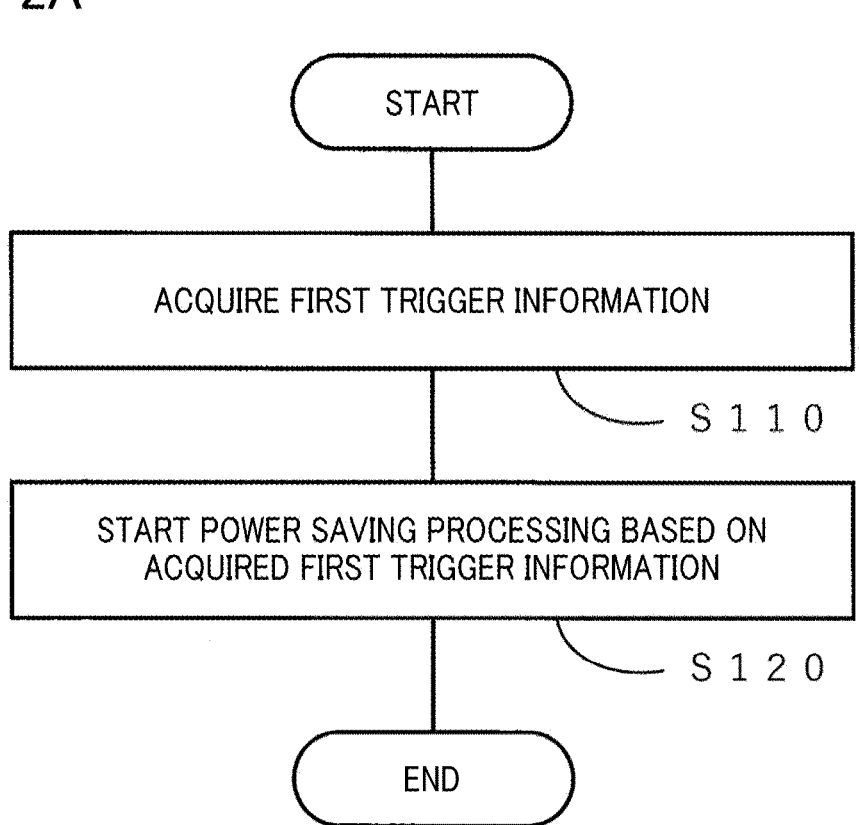
FIG. 2A is a flowchart of an example of a control method for an electronic device in the first embodiment.

The controller 12 described above is capable of executing a control method for controlling the electronic device 10. FIG. 2A is a flowchart of an example of the control method for an electronic device in the first embodiment.

The controller 12 acquires first trigger information for starting the power saving processing (step S110). The first trigger information may be information indicating that the line of sight of the user is directed outside of the display 11, or may be information indicating that the line of sight of the user is not directed to the display 11 continuously over a predetermined time period. The user's line of sight directed outside of the display 11 also means that the user's line of sight is off the display 11. The first trigger information may also be information indicating that the user is not in front of the display 11, and is information indicating that the user is not in front of the display 11 over a predetermined time period. For example, the first trigger information may be information indicating that the user's line of sight is kept outside of the display 11 continuously over three seconds.

In one example, the electronic device 10 further includes a connection port 17 for connecting to at least one external display 20. The connection port 17 may include, for example, a USB port, an HDMI (registered trademark) port, a DVI port, a DisplayPort port, or a VGA port. When a user uses the electronic device 10, the user directs his/her line of sight to the display 11 or the external display 20. With this, the controller 12 may set the first trigger information on the basis of one of the display 11 and the external display 20. For example, the first trigger information may be information indicating that the user's line of sight is kept outside of the external display 20 over a predetermined time period. Furthermore, the first trigger information may be information indicating that the user's line of sight is kept outside of both the display 11 and the external display 20 continuously over a predetermined time period.

The electronic device 10 may include the detection device 15 for acquiring the first trigger information such as that described above. For example, the detection device 15 may be a camera or an infrared camera capable of capturing an image of a space in front of the display 11, or may be a human-presence sensor that uses ultrasonic waves, visible light, or infrared rays. Furthermore, the detection device 15 may be eyeglasses capable of detecting the user's line of sight, or another type of wearable device capable of detecting the user's line of sight. The controller 12 may acquire the first trigger information directly from the detection device 15, or may acquire the first trigger information by receiving detection data from the detection device 15 and performing image processing to the detection data.

In another embodiment, the first trigger information is information indicating that the user has entered a specific command. The electronic device 10 may include an input device 16 for acquiring such first trigger information. The input device 16 is an input interface that receives a command from a user. The input device 16 may include a mouse, a keyboard, a touch panel, a touch pad, a switch, a button, a microphone, or a camera, for example. The input device 16 converts the command or an operation received from the user into an electric signal, and transmits the electric signal to the controller 12.

The specific command related to the first trigger information may be an initial setting (default setting) stored in advance in the storage 14, or may be a command defined by the user. The specific command related to the first trigger information may be a shortcut key including at least one combination of keys, or may be a command based on a single key or a button. The specific command may also be a command based on a combination of inputs via a plurality of the input devices 16. For example, the command may be a command based on an input made by pressing one predetermined key on the keyboard, or may be a command based on an input made by pressing a specific key on the keyboard and a specific button on the mouse at the same time. The controller 12 may acquire the first trigger information directly from the input device 16, or may acquire the first trigger information by receiving data input by the input device 16 and analyzing the input data.

The first trigger information may also be information indicating that a specific command has not been entered for a predetermined time period, or may be information indicating that there has no input from the input device 16 for a predetermined time period.

The controller 12 then starts the power saving processing on the basis of the acquired first trigger information (step S120). Specifically, in a case where the first trigger information is directly received from the detection device 15, the controller 12 starts the power saving processing as soon as the data (first trigger information) is received from the detection device 15. In a case where the detection data of the image data or raw data is received from the detection device 15, the controller 12 starts the power saving processing upon determining that the data acquired from the detection device 15 or the input device 16 matches the first trigger information.

FIG. 2B is a flowchart of an example of the power saving processing in the first embodiment. In the power saving processing, the controller 12 acquires a still image on the basis of the screen of the display 11 (step S210), and displays the still image on the display 11 (step S220). In one embodiment, the still image has the same size as the size of the entire screen of the display 11. In this manner, when the still image is displayed, the still image covers the entire screen of the display 11 and the displayed screen remains still. Even in a case a media player application keeps replaying a movie, because the still image is displayed on the forefront, the screen of the display 11 appears to remain still.

In the power saving processing, the controller 12 minimizes the size of at least one currently open window while the still image is being displayed (step S230). In step S230, even in a case where a plurality of windows are open, the controller 12 may minimize at least one of the windows.

Even with the window minimized, the corresponding application continues to be executed by the controller 12, but is not displayed on the screen. In this manner, it is possible to skip some processing for displaying the application in a window. Therefore, it is possible to achieve power saving in the electronic device 10. There are also some applications that can be executed in the background by structurally minimizing the window. By minimizing the window of such an application, further power saving of the electronic device 10 can be achieved. To achieve further power savings, the controller 12 may minimize all of the open windows.

In the power saving processing, minimization of the window is carried out while the still image is being displayed. The flickering due to the effect or animation of the minimization is blocked by the displayed still image, and is not seen on the display 11. Therefore, by displaying a still image, flickering of the screen at the time of minimization can be suppressed.

After the window is minimized, the controller 12 may undisplay the still image, or may keep displaying the still image. Undisplaying the still image means stopping to display the still image. Once the still image to be undisplayed, the still image is no longer displayed, and a desktop or a window that has not yet been minimized appears on the screen.

It is not necessary to acquire and display the still image while the electronic device 10 is in a sleep mode, while an OS login standby screen is being displayed, while the display 11 is not powered on, or while the display 11 is displaying a screen saver.

However, in such a case, the controller 12 may minimize the size of at least one window that is currently open.

Figure 3A:
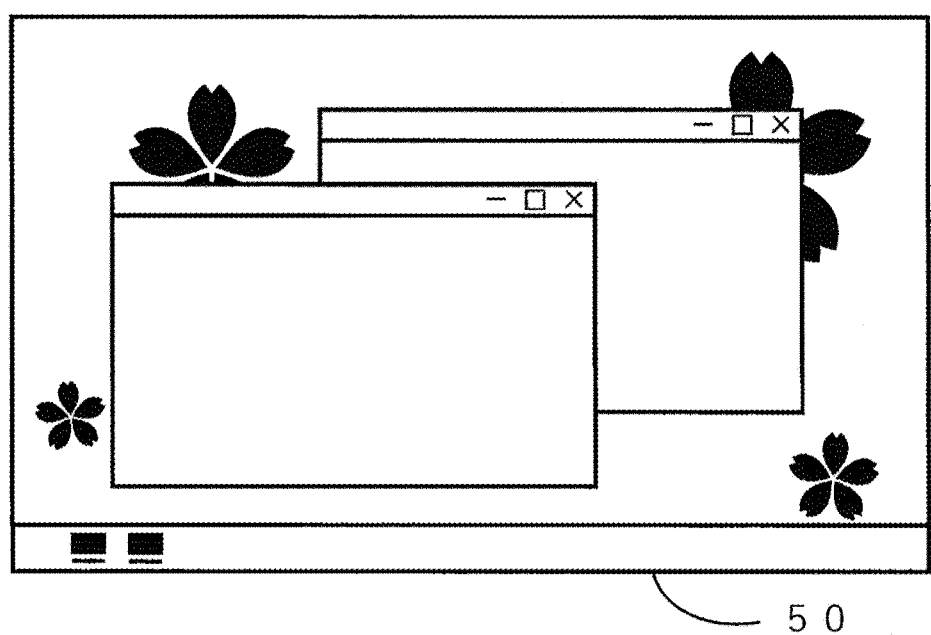
FIG. 3A is an example of a screen before the power saving processing is performed in the first embodiment.
Figure 3B:
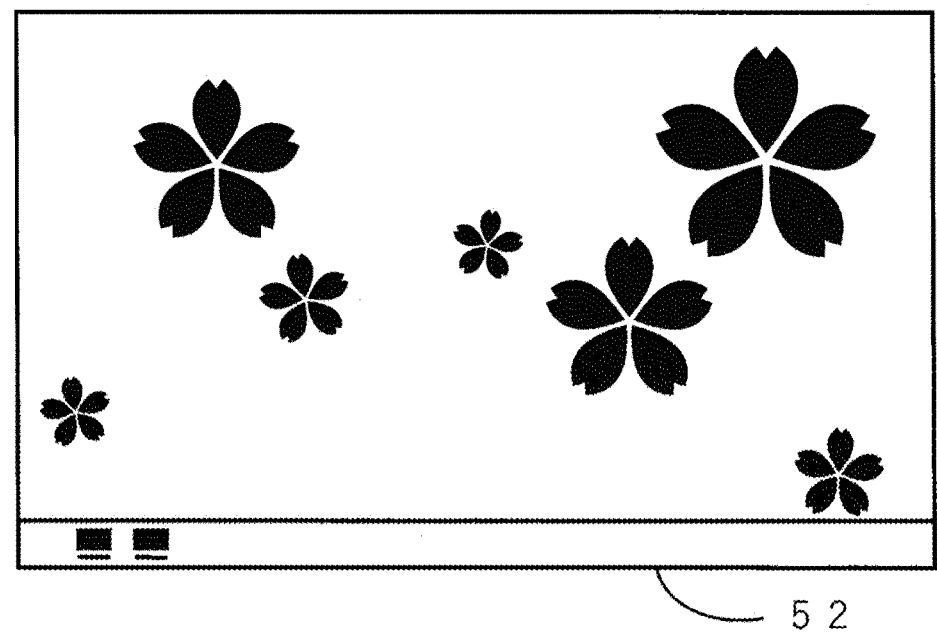
FIG. 3B is an example of a screen after the power saving processing is performed in the first embodiment.

FIG. 3A is an example of a screen before power saving processing is performed in the first embodiment, and FIG. 3B is an example of a screen after the power saving processing is performed. A screen 50 shows a screen displayed by the display 11 when the power saving processing is started. In the example illustrated in FIG. 3A, two windows are open, and the display 11 displays the two windows on the desktop and displays icons representing the applications corresponding to the two windows on the task bar. In the power saving processing, the controller 12 acquires a screenshot of the screen 50 as a still image, and displays the screenshot on the screenshot display 11. The controller 12 then minimizes all the windows behind the still image being displayed, and then undisplays the screenshot. Once the screenshot of the screen 50 is undisplayed, the desktop with all of the windows minimized is displayed, as illustrated in screen 52 of FIG. 3B.

<Still Image>

The still image enabled to be displayed by the power saving processing will now be described in detail.

In one example, the still image is a screenshot captured before minimizing the size of the at least one window. For example, the still image may be a screenshot at the time of when the power saving processing is started. The controller 12 may acquire the screenshot using an API of the OS, or using other software.

Figure 4A:
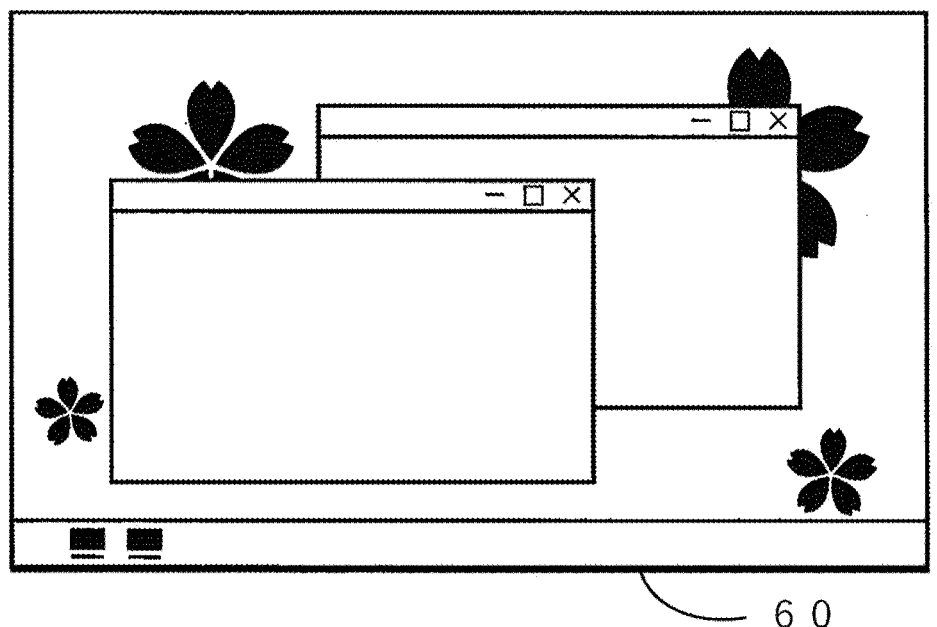
FIG. 4A is an example of a still image in the first embodiment.

FIG. 4A is an example of the still image in the first embodiment. A still image 60 illustrated in FIG. 4A is a screenshot before the size of the window is minimized, that is, a screen having been displayed on the display 11 immediately before the window is minimized. When such a still image is used, not only the flickering is suppressed, but also the power saving processing, which is automatically executed, is made hardly noticeable by the user, so that the usability of the electronic device 10 can be improved.

Figure 4B:
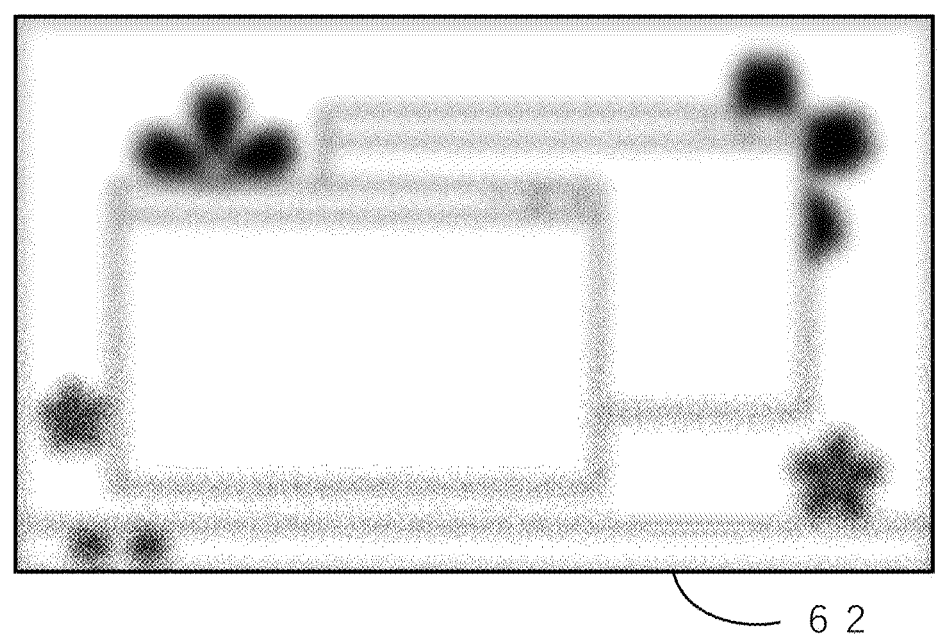
FIG. 4B is an example of the still image in the first embodiment.

In one example, the still image is an image resultant of blurring a screenshot. FIG. 4B is an example of the still image in the first embodiment. The still image 62 illustrated in FIG. 4B is an image resultant of blurring the screenshot (FIG. 4A) captured before the window size is minimized. The controller 12 can acquire a blurred still image by performing, for example, low-pass blurring, Gaussian blurring, mosaic processing, and the like on the screenshot acquired by the API of the OS or the like.

In the power saving processing, when an image resultant of blurring the screenshot is displayed as a still image, not only flickering can be suppressed, but also the security of the electronic device 10 can be improved. For example, when the user is not in front of the electronic device, the electronic device 10 automatically performs the power saving processing, and displays a blurred image on the display 11. If the original screen has some personal information or confidential information, these pieces of information is illegible in the blurred image. Therefore, the risk of information leaks can be eliminated even if a third party who is not the user of the electronic device 10 takes a look at the screen. Therefore, the power saving processing according to the present disclosure also serves as a security measure, so that the security and the usability of the electronic device 10 can be improved.

In one example, the still image is a pre-stored image. In such a case, the controller 12 acquires a still image by reading the still image stored in the storage 14. Furthermore, in a configuration in which the electronic device 10 includes a communication device (not illustrated), the controller 12 may acquire a still image via the communication device and a network. For example, the controller 12 may download the still image from a specific server.

Figure 4C:
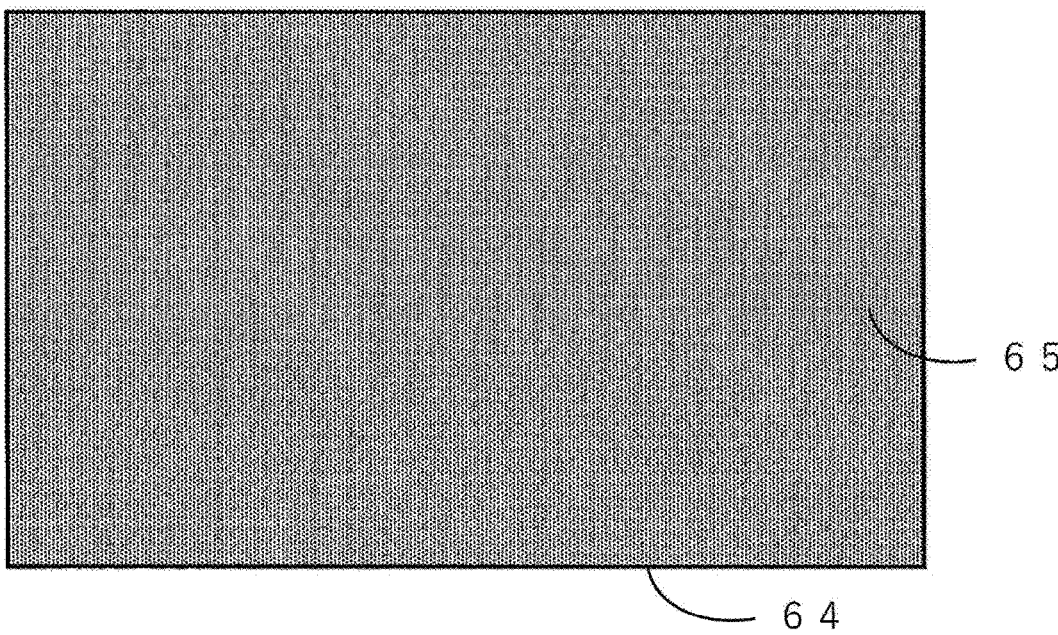
FIG. 4C is an example of the still image in the first embodiment.
Figure 4D:
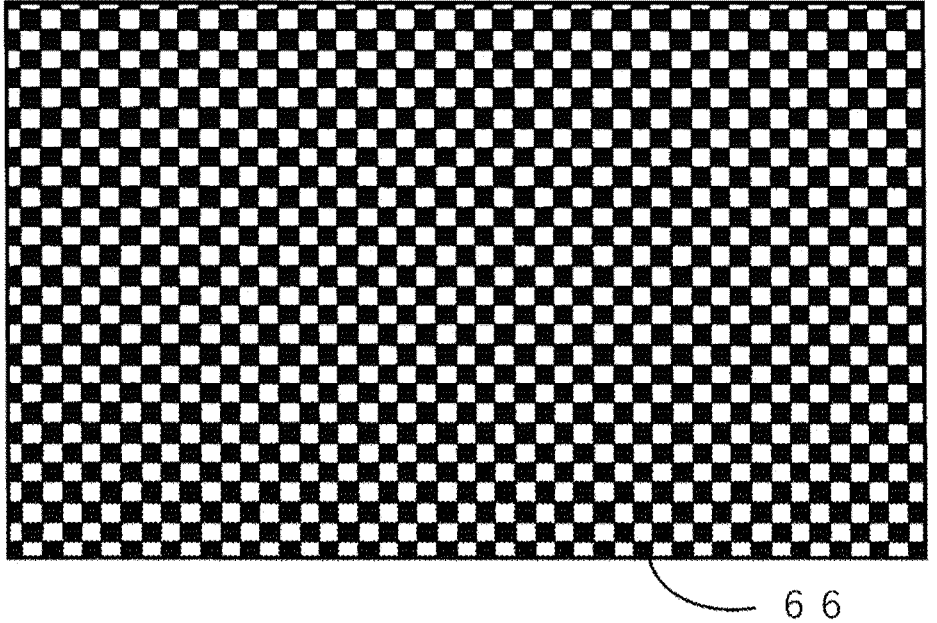
FIG. 4D is an example of the still image in the first embodiment.

FIGS. 4C and 4D are examples of the still image according to the first embodiment. In a still image 64 illustrated in FIG. 4C, hatching 65 indicates that it is filled with a specific color such as black. A still image 66 illustrated in FIG. 4D is an image filled with a specific pattern. If such an image is displayed as a still image in the power saving processing, a third party cannot recognize the information displayed on the original screen, so that the security of the electronic device 10 can be enhanced.

Note that, instead of the still image, it is also possible to use a medium of any format capable of suppressing flickering. For example, a moving image such as a GIF image or a PNG image, or a moving image such as AVI, WMV, or MPEG4 may be displayed on the display 11, instead of a still image.

<Restoring Processing>

The controller 12 of the electronic device 10 can perform restoring processing for restoring the size of the window to the original size after performing the power saving processing. Such restoring processing will now be described.

Figure 5A:
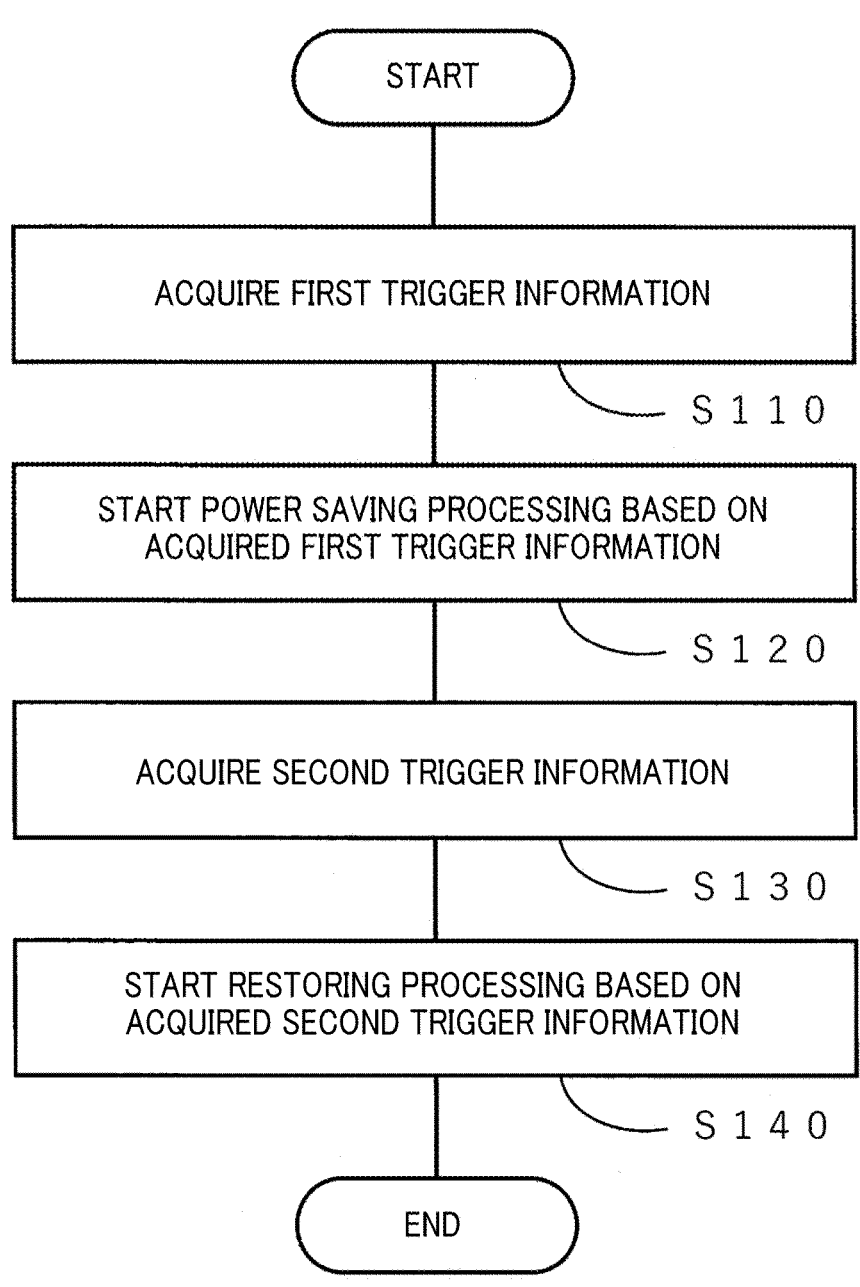
FIG. 5A is a flowchart of another example of the control method for an electronic device in the first embodiment.

FIG. 5A is a flowchart of another example of the control method for an electronic device in the first embodiment. In the example of FIG. 5A, the control method for an electronic device further includes step S130 and step S140. After starting the power saving processing (step S120), the controller 12 further acquires second trigger information for cancelling the power saving processing (step S130). Then, the restoring processing for cancelling the power saving processing is started on the basis of the acquired second trigger information (step S140).

The second trigger information may be information indicating that the line of sight of the user is directed to the display 11, or may be information indicating that the line of sight of the user is directed to the display 11 continuously over a predetermined time period. The second trigger information may also be information indicating that the user is in front of the display 11, and is information indicating that the user is in front of the display 11 over a predetermined time period. For example, the second trigger information may be information indicating that the user's line of sight is kept on the display 11 continuously over three seconds.

The second trigger information may also be information indicating that the user has entered a specific command. The specific command related to the second trigger information may be an initial setting stored in advance in the storage 14, or may be a command defined by the user, in the same manner as the first trigger information.

The controller 12 can acquire the second trigger information described above, using the detection device 15 and/or the input device 16. Note that the second trigger information may be paired with the first trigger information (e.g., the user's line of sight not directed to the display 11, with respect to being directed to the display 11), or may be information unrelated to the first trigger information. For example, the first trigger information may be set to "the user is not in front of the display 11", and the second trigger information may be set to "a specific command has been entered".

In a case where the second trigger information is directly received from the detection device 15, the controller 12 starts the restoring processing as soon as the data (second trigger information) is received from the detection device 15. In a case where the detection data of the image data or raw data is received from the detection device 15, the controller 12 starts the restoring processing upon determining that the data acquired from the detection device 15 or the input device 16 matches the second trigger information.

Figure 5B:
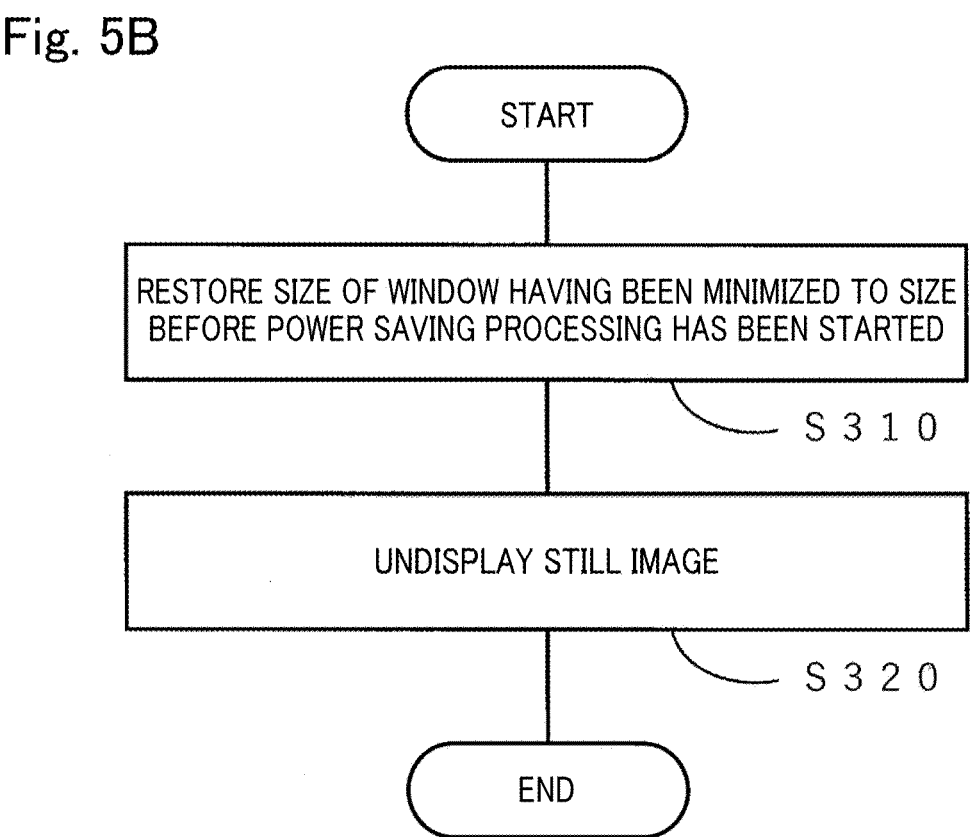
FIG. 5B is a flowchart of an example of restoring processing in the first embodiment.

FIG. 5B is a flowchart of an example of the restoring processing in the first embodiment. In the restoring processing, the controller 12 may restores the size of the at least one window having been minimized (i.e., at least one window having a minimized size) to the size before the power saving processing has been started (step S310). The controller 12 can restore the size and the position by and at which the window having been minimized is displayed, using the API of the OS. Alternatively, the controller 12 may store the size and position of the window in the storage 14 before minimizing the window in the power saving processing, and restore the window to the original condition using the stored data in step S310. In one embodiment, the controller 12 restores all of the windows having been minimized in the power saving processing. Note that, in the present disclosure, the position of a window indicates the coordinates of the window within the screen.

After restoring the size and the position of the window, the controller 12 undisplays the still image being displayed (step S320). For example, when a still image that is a screenshot of the screen 50 in FIG. 3A is undisplayed, the desktop with all of the windows minimized is displayed as illustrated in the screen 52 in FIG. 3B.

Note that the controller 12 may undisplay the still image at a timing different from step S320. For example, the controller 12 may undisplay the still image immediately after step S230 (FIG. 2B) or before step S310 (FIG. 5B). When the still image has already been undisplayed after step S230 (FIG. 2B) in the power saving processing, step S320 may be omitted.

In one example, the window is restored while the still image is being displayed, in order to suppress flickering due to the effect or the animation in restoring the window size. For example, the still image may be kept being displayed until the window is restored. Alternatively, the display of the still image may be temporarily undisplayed after the window is minimized, but the still image may be displayed again before the window is restored. The still image used in the power saving processing and the still image used in the restoring processing may be different. For example, a screenshot before the window is minimized may be used as a still image in the power saving processing, and a screenshot before the window is restored (that is, after the window is minimized) may be used as a still image in the restoring processing. In this manner, flickering due to the effect or the animation in restoring the window is blocked by the still image being displayed, and is not visible on the display 11.

The restoring processing may be skipped while the electronic device 10 is in a sleep mode, while an OS login standby screen is being displayed, while the display 11 is not powered on, or while the display 11 is displaying a screen saver. For example, when the electronic device 10 is not used over a certain period of time after the power saving processing is performed, the electronic device may enter a sleep mode, or start a screen saver. In such cases, because a certain level of power saving can be achieved and it is clear that the user is not using the electronic device 10, the display may be kept being without restored to the state before the power saving processing has been started.

Even if the data acquired from the detection device 15 or the input device 16 matches the first trigger information, the controller 12 may omit starting the power saving processing in following situations.

The first case is a case where a determination as to whether the data matches the second trigger information for the restoring processing is to be carried out while the power saving processing is being executed data after data has been determined to match the first trigger information. It is assumed herein that the first trigger information is information indicating that the user's line of sight is not directed to the display 11. The user may sometimes look at the scenery around the user, a document on the desk, or someone else for a short time period, while the user is using the electronic device 10, without directing his/her line of sight to the display 11. In such a case, the effect of power saving achieved by the power saving processing is limited, and the usability of the electronic device 10 may be impaired by minimizing the size of the window. Therefore, the power saving processing currently being performed may be aborted. After the power saving processing is aborted, the restoring processing may be performed or not performed.

The second case is a case where it has been determined that the first trigger information has matched, but it can be confirmed that the electronic device 10 is being used by the user on the basis of other information. For example, the user may keep operating the input device 16, such as a keyboard or a mouse, without directing his/her line of sight to the display 11 over a short time period. Therefore, it is possible for the controller 12 not to perform the power saving processing while inputs not matching the first trigger information are being received from the input device 16, even if the data acquired from the detection device 15 is determined to match the first trigger information.

<Application Suitable for Power Saving Processing>

With the control method for an electronic device according to the present disclosure, power saving can be achieved for any application, by saving the power consumed by a window for displaying such an application; however, the effect of power saving is particularly prominent for the following applications.

In one embodiment, such an application is an application that performs image processing in real time. The controller 12 executing such an application performs image processing in real time, and displays a processing result in a window of the application. The power saving processing is suitable for applications that utilize a lot of CPUs and/or graphics processing unit (GPU), for example.

In one embodiment, the application is an application having a configuration that consumes less power during execution with the window minimized, than a predetermined threshold for a power consumption during execution without the window minimized. For example, the power saving processing is suitable for applications that are executable in the background with the window minimized.

Specific examples of such an application include browser-related applications such as Chrome (registered trademark) or Edge (registered trademark), online meeting applications such as Teams (registered trademark) and Zoom (registered trademark), an image processing application such as CAD (registered trademark) and Photoshop (registered trademark), media player applications, and gaming applications. The electronic device, the control method for an electronic device, and the like according to the present disclosure is particularly suitable for such an application, because a relatively large amount of power saving can be achieved by minimizing the size of the corresponding window. For example, for an online meeting application executing a screen sharing function, the CPU usage and the power consumption while the window is minimized can be equal to or less than a half of the CPU usage and the power consumption while the window is maximized.

With this, the control for causing the electronic device 10 to perform the power saving processing for minimizing the size of the window is ended. Power saving can be achieved in situations such as the user's line of sight is not directed to the display 11. The restoring processing for restoring the size of the window may be further performed.

The present disclosure also provides a computer program and a storage medium for controlling the electronic device 10.

In one embodiment, a computer program used for causing the electronic device 10 to execute the control method for an electronic device is provided.

In one embodiment, the computer program described above is stored in a non-transitory computer-readable storage medium. By causing the controller 12 in the electronic device 10 to read and execute the computer program, the control method described above is implemented.

With the configuration of the electronic device 10, the control method for the electronic device 10, the computer program, and the recording medium, the power saving processing can be performed while the electronic device 10 is in use. In the power saving processing, because the size of the window is minimized, and the processing for displaying the application corresponding to the window can be omitted, power saving can be achieved in the electronic device 10. Furthermore, because the window is minimized while the still image is being displayed, it is possible to suppress flickering of the screen at the time when the window is minimized. Similarly, in the restoring processing, if the size of the window can be restored while the still image is being displayed, it is possible to suppress flickering of the screen at the time when the window size is restored. Furthermore, by using the first trigger information, the second trigger information, and/or the application described above, it is possible to save power more efficiently, and to improve the availability of the electronic device.

Second Embodiment

<Power Saving Processing Reducing Size of Window>

In a second embodiment, the controller 12 can achieve power saving in the electronic device 10 by reducing the size of the window using the power saving processing.

Figure 6A:
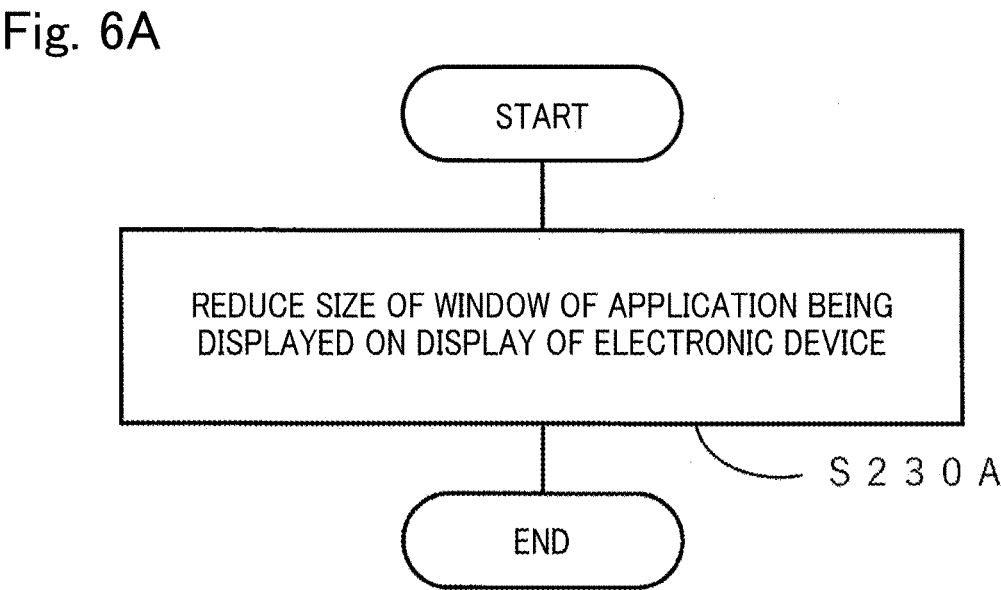
FIG. 6A is a flowchart of an example of power saving processing in a second embodiment.
Figure 6B:
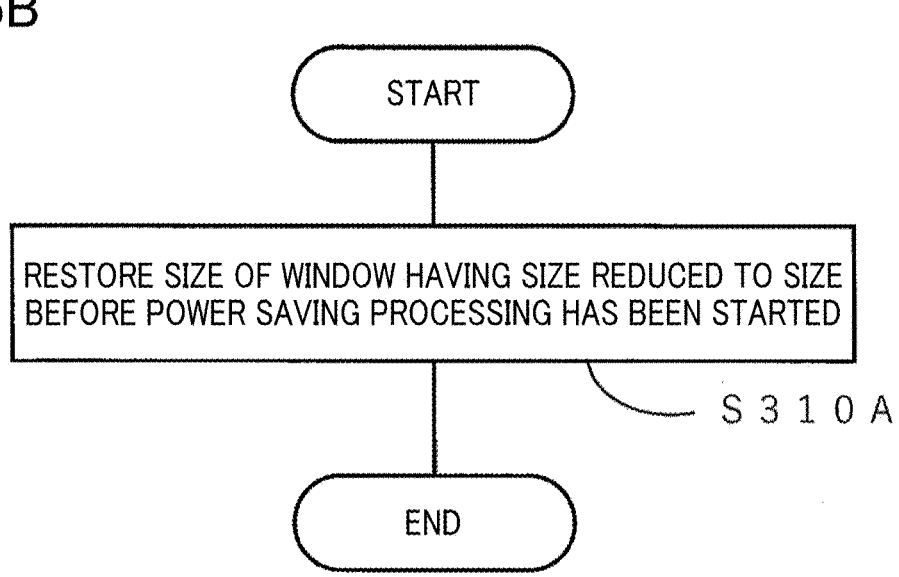
FIG. 6B is a flowchart of an example of restoring processing in the second embodiment.

FIG. 6A is a flowchart illustrating an example of power saving processing in the second embodiment, and FIG. 6B is a flowchart illustrating an example of restoring processing according to the second embodiment. In the second embodiment, the main sequence of starting the power saving processing with the first trigger information and starting the restoring processing with the second trigger information is the same as that in the first embodiment. The second embodiment is different from the first embodiment in that the window size is not minimized but reduced, and that no still image is displayed.

In the power saving processing illustrated in FIG. 6A, the controller 12 reduces the size of at least one window of at least one application being displayed on the display 11 of the electronic device 10 (step S230A). The controller 12 may reduce the sizes of all open windows using the API of the OS. Note that, in general, an API function for minimizing the size of the window and an API function for reducing the size are different functions, and are different processing, in the API. An application with a window having a reduced size, without being minimized, is not executed only in the background. Therefore, as the window of the same application, slightly larger amount of power is consumed by the window having the reduced size, than that consumed by a minimized window.

The window reduction ratio (that is, the degree by which the windows size is reduced) may be set in accordance with an initial setting stored in advance in the storage 14, or a setting entered by the user. For example, the size of the open window may be reduced to ⅔, ½, ⅓, ¼, or the like of the current size, or may be reduced to a fixed size such as 100×100 (pixels×pixels; the same applies to the following), 120×90, 160×90, or the like. Furthermore, as to the position (coordinates) of the window having a reduced size, the window having the reduced size may remain at the same position, or may be set to a position different from the original window.

Correspondingly to the power saving processing, in the restoring processing illustrated in FIG. 6B, the size of at least one reduced window is restored to the size before the power saving processing has been started (step S310A). The controller 12 may restore the size and the position for displaying the reduced window, using the API of the OS. Alternatively, the controller 12 may store the size and position of the window in the storage 14 before the window size is reduced in the power saving processing, and restore the window to the original size and the position for displaying the window using the data stored in step S310A. In one embodiment, the controller 12 restores all of the windows having the respective sizes reduced by the power saving processing to the respective original sizes and displaying positions.

Figure 7A:
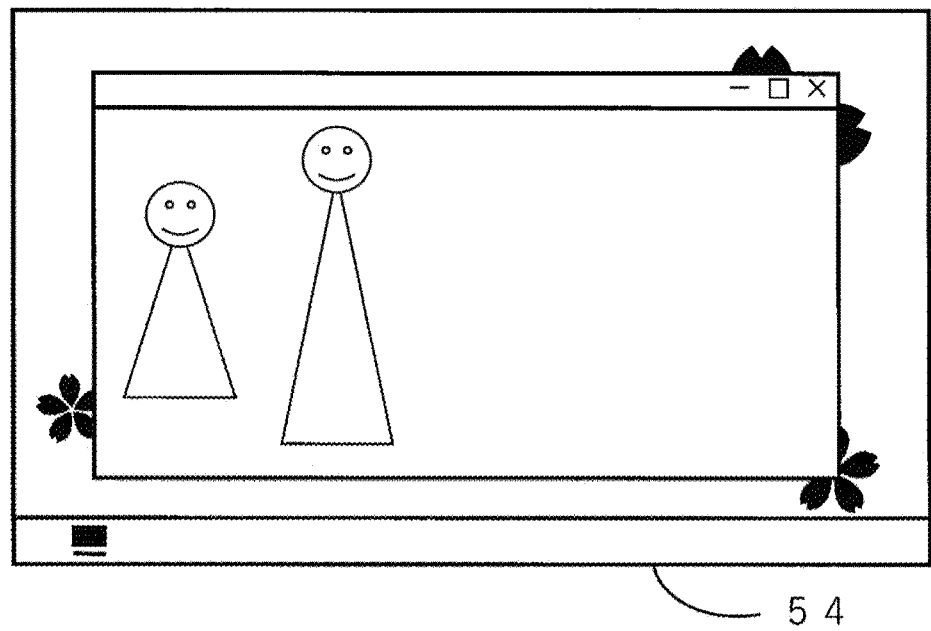
FIG. 7A is an example of a screen before the power saving processing is performed in the second embodiment.
Figures 7B, 8A:
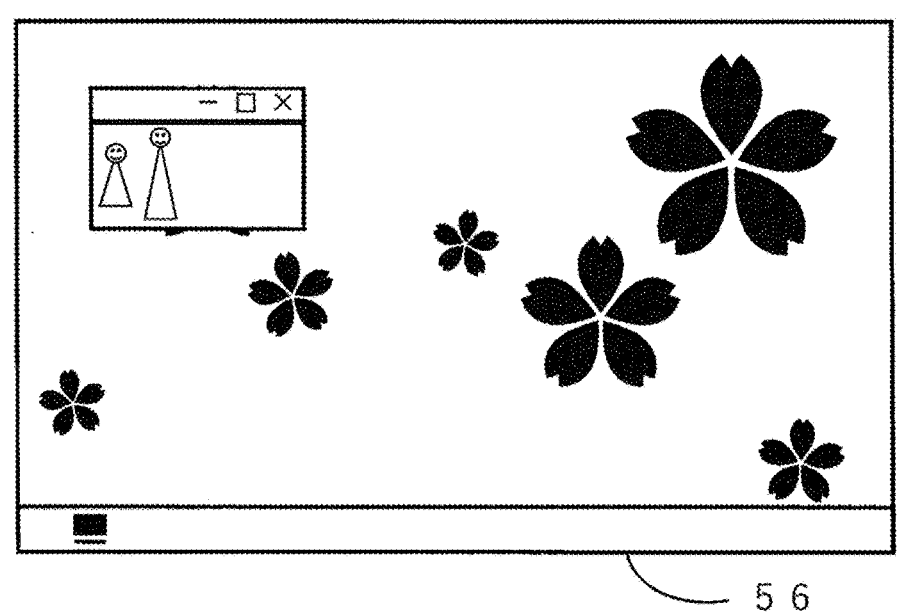
FIG. 7B is an example of a screen after the power saving processing is performed in the second embodiment.
FIG. 8A is a flowchart of an example of power saving processing in a third embodiment.

FIG. 7A is an example of a screen before the power saving processing is performed in the second embodiment, and FIG. 7B is an example of a screen after the power saving processing is performed in the second embodiment. A media player replaying a movie is displayed in a window on the screen 54 in FIG. 7A. In step S230A, as illustrated in screen 56 in FIG. 7B, the controller 12 sets the size of the window to ⅓ the original size, and displays the window having the reduced size at the same position as the original window.

With such control, because the size of the window is reduced in the power saving processing, the area occupied by the application corresponding to the window is reduced. Because the amount of calculation required for displaying the window is reduced, it is possible to achieve power saving in the electronic device 10.

Third Embodiment

<Power Saving Processing for Reducing Window Size With Use of Still Image>

In a third embodiment, the controller 12 displays a still image before and after the size of the window is reduced, and/or before and after the size of the window is restored. As a result, it is possible to suppress flickering while the size of the window is being changed.

Figure 8B:
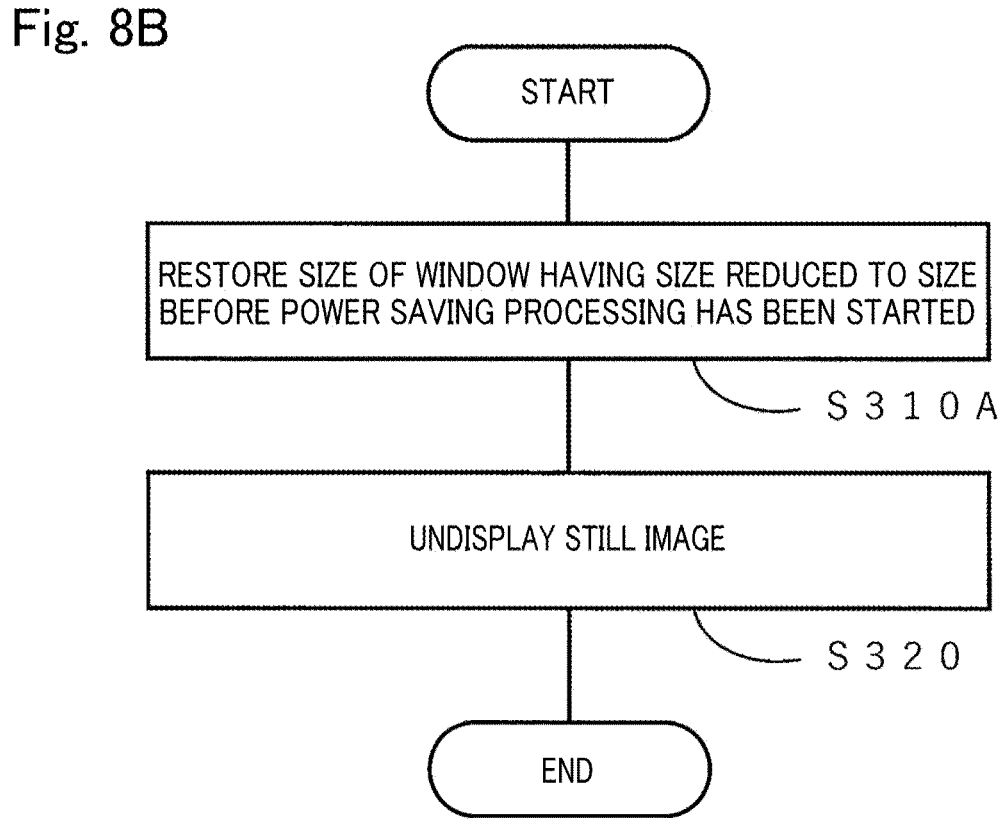
FIG. 8B is a flowchart of an example of restoring processing in the third embodiment.

In the third embodiment, the main sequence of starting the power saving processing with the first trigger information and starting the restoring processing with the second trigger information is the same as that in the first embodiment. FIG. 8A is a flowchart illustrating an example of power saving processing in the third embodiment, and FIG. 8B is a flowchart illustrating an example of restoring processing according to the third embodiment. The third embodiment is different from the second embodiment in that the power saving processing further includes step S210 and step S220, and the restoring processing further includes step S320.

Steps S210 and S220 in the power saving processing in FIG. 8A and step S320 in the restoring processing in FIG. 8B are the same as steps S210 and S220 in FIG. 2B, and step S320 in FIG. 5B according to the first embodiment, respectively. The type of the still image, how the still image is acquired and how the still image is undisplayed, and the timing at which the still image is displayed are the same as those in the first embodiment, and redundant descriptions are omitted herein.

In the power saving processing according to the third embodiment, the controller 12 reduces the size of at least one window of at least one application being displayed on the display 11 while the still image is being displayed (step S230A). In one embodiment, the controller 12 reduces the sizes of all the open windows.

By contrast, in the restoring processing, the controller 12 restores the size of the window to the size before the power saving processing has been started (step S310A), and then undisplays the still image (step S320).

With such control, it is possible not only to achieve power saving in the electronic device 10 but also to suppress flickering in changing the size of the window. Furthermore, it is also possible to improve the security of the electronic device while the user is not in front of the electronic device, for example.

Fourth Embodiment

<Power Saving Processing for Adjusting Luminance>

In a fourth embodiment, the controller 12 lowers the luminance of the display 11 in the power saving processing, so that further power saving in the electronic device 10 is achieved.

Figure 9A:
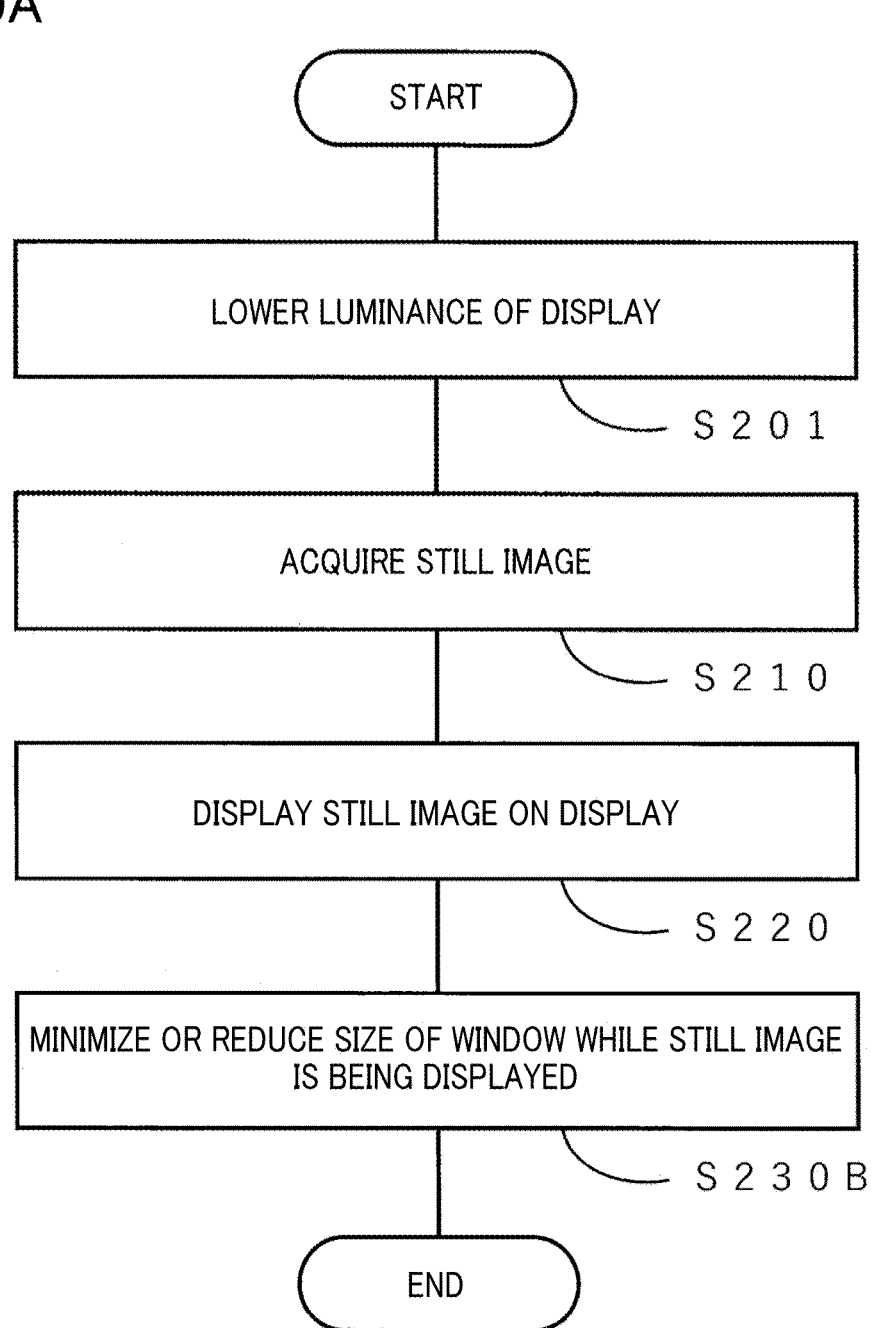
FIG. 9A is a flowchart of an example of power saving processing in a fourth embodiment.
Figure 9B:
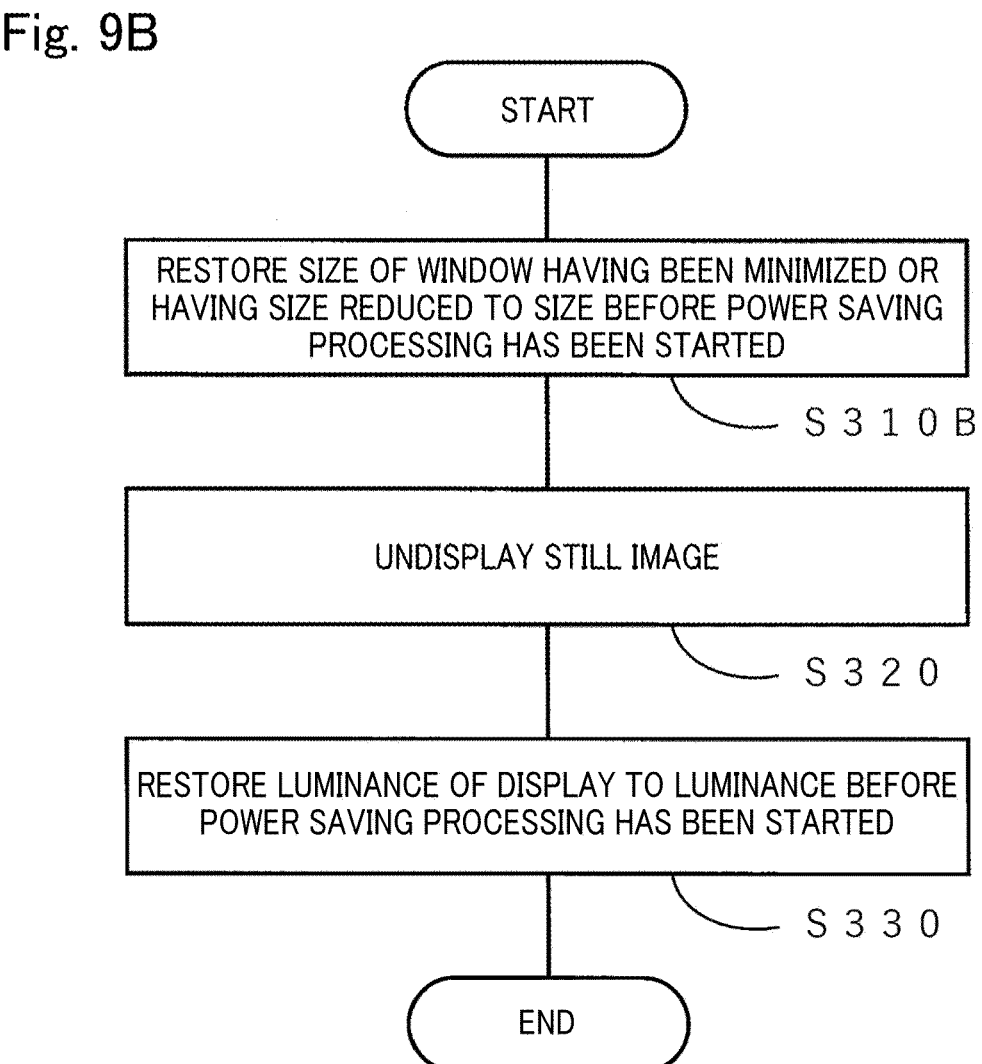
FIG. 9B is a flowchart of an example of restoring processing in the fourth embodiment.

In the fourth embodiment, the main sequence of starting the power saving processing with the first trigger information and starting the restoring processing with the second trigger information is the same as that in the first embodiment. FIG. 9A is a flowchart illustrating an example of power saving processing in the fourth embodiment, and FIG. 9B is a flowchart illustrating an example of restoring processing according to the fourth embodiment. The fourth embodiment is different from the first embodiment in that the size of the window may be minimized or reduced, and the luminance of the display 11 is adjusted.

Steps S210 and S220 in the power saving processing of FIG. 9A and step S320 in the restoring processing in FIG. 9B are the same as steps S210 and S220 in FIG. 2B, and step S320 in FIG. 5B according to the first embodiment, respectively. When a still image is used, the type of the still image, how the still image is acquired and how the still image is undisplayed, and the timing at which the still image is displayed are the same as those in the first embodiment, and redundant descriptions are omitted herein.

In the power saving processing illustrated in FIG. 9A, the size of the window is either minimized or reduced while the still image is being displayed (step S230B). In the power saving processing, the controller 12 lowers the luminance of the display 11 (step S201). Note that, in the embodiment illustrated in FIG. 9A, the luminance is lowered (step S201) before the still image is displayed (step S220), but the present invention is not limited thereto.

To lower the luminance, the controller 12 may directly specify a numerical value (e.g., a numerical value in units of "nit" or "cd/m²") of the lowered luminance. The controller 12 may also specify the lowered luminance as a ratio with respect to the maximum luminance or as a ratio with respect to the original luminance. The degree by which the luminance is lowered may be set in accordance with an initial setting stored in advance in the storage 14, or a setting entered by the user. For example, the luminance may be lowered to $\frac{2}{3}$, $\frac{1}{2}$, $\frac{1}{3}$, $\frac{1}{4}$, or the like of the original luminance, or may be lowered to 100 cd/m², 50 cd/m², or 30 cd/m².

In the restoring processing illustrated in FIG. 9B, after the size of the window is restored (step S310B), the luminance of the display 11 is restored to the luminance before the power saving processing has been started (step S330). For example, the controller 12 may store the luminance in the storage 14 at the time when the power saving processing is started, and restore the luminance to the original value using the stored data in step S330. Note that the luminance may be restored (step S330) before the window size is restored (step S310B) and/or before the still image is undisplayed (step S320).

In addition, the technology for adjusting the luminance may be executed regardless of whether a still image is being displayed. In the embodiment illustrated in FIGS. 9A and 9B, the luminance of the display 11 is adjusted, and a still image is used, too. However, in a case where the technology for adjusting luminance is combined with the second embodiment, step S210, step S220, and step S320 of acquiring, displaying, and undisplaying a still image may be omitted.

In this manner, the power saving processing and/or restoring processing for adjusting the luminance are ended. By reducing the luminance of the display 11 in the power saving processing, it is possible to achieve further power saving while the electronic device 10 is in use.

Fifth Embodiment

<Power Saving Processing for Disabling Input Device>

In a fifth embodiment, the controller 12 achieves further power saving in the electronic device 10 by disabling the input device 16.

Figure 10A:
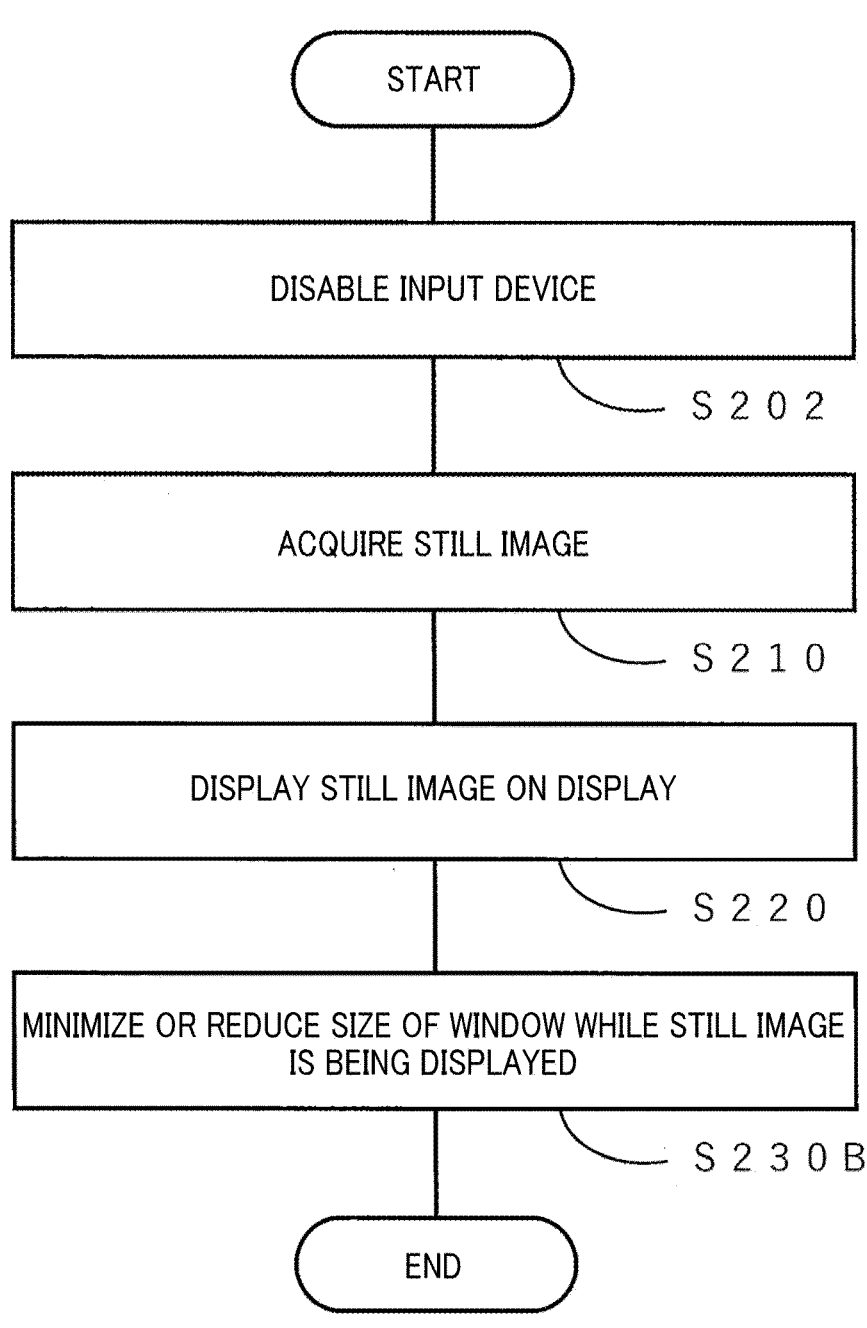
FIG. 10A is a flowchart of an example of power saving processing in a fifth embodiment.
Figure 10B:
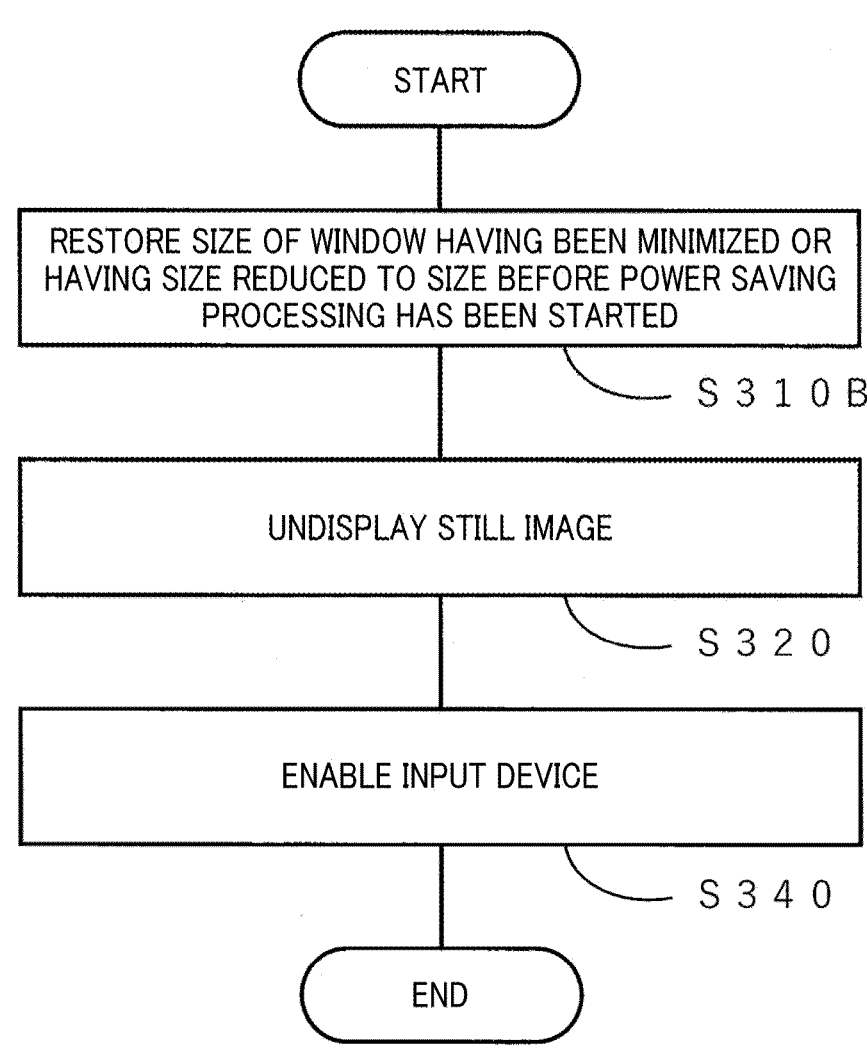
FIG. 10B is a flowchart of an example of restoring processing in the fifth embodiment.

In the fifth embodiment, the main sequence of starting the power saving processing with the first trigger information and starting the restoring processing with the second trigger information is the same as that in the first embodiment. FIG. 10A is a flowchart illustrating an example of power saving processing in the fifth embodiment, and FIG. 10B is a flowchart illustrating an example of restoring processing according to the fifth embodiment. The fifth embodiment is different from the first embodiment in that the window size may be minimized or reduced, and the input device 16 is disabled.

Steps S210 and S220 in the power saving processing of FIG. 10A and step S320 in the restoring processing of FIG. 10B are the same as steps S210 and S220 in FIG. 2B, and step S320 in FIG. 5B according to the first embodiment, respectively. Step S230B in the power saving processing in FIG. 10A and step S310 in the restoring processing in FIG. 10B are the same as step S230B in FIG. 9A and step S310 in FIG. 9B, respectively. When a still image is used, the type of the still image, how the still image is acquired and how the still image is undisplayed, and the timing at which the still image is displayed are the same as those in the first embodiment, and redundant descriptions are omitted herein.

In the power saving processing illustrated in FIG. 10A, the controller 12 disables the input device 16 using an API of the OS or software other than the OS (step S202). Note that, in the embodiment illustrated in FIG. 10A, the input device 16 is disabled (step S202) before the still image is displayed (step S220), but the present invention is not limited thereto.

Disabling the input device 16 means discarding the input data from the input device 16, that is, not accepting any input from the input device 16. While the input from the input device 16 is disabled, the microcomputer in the input device 16 does not transmit the input data to the controller 12. Because the transmission of the input data and the processing for a command included in the input data can be omitted, further power saving can be achieved in the electronic device 10.

In the restoring processing illustrated in FIG. 10B, after restoring the size of the window (step S310B), the controller 12 enables the input device 16 using the API of the OS or the like (step S340). Note that the input device 16 (step S340) may be enabled before the window size is restored (step S310B) and/or the still image is undisplayed (step S320).

For example, it is assumed herein that the input device 16 is a keyboard, the first trigger information and the second trigger information are both information indicating that the same specific shortcut has been entered. When the user presses the shortcut, the controller 12 starts the power saving processing, and disables the input device 16. When the user presses the same shortcut again, the controller 12 starts the restoring processing, and releases the disablement of the input device 16, that is, enables the input device 16.

In one embodiment, the controller 12 stops power supply to the input device 16 while the input device 16 is disabled. In this manner, further power saving can be achieved in the electronic device 10. In this case, the first trigger information and the second trigger information are information not dependent on the input device 16, and for example, are preferably information obtained from a detection result of the detection device 15.

In addition, the technology for disabling the input device 16 may be executed regardless of whether a still image is being displayed. In the embodiment in FIGS. 10A and 10B, the input device 16 is disabled and enabled, and a still image is used, too. However, in a case where the technology for disabling and enabling the input device 16 is combined with the second embodiment, step S210, step S220, and step S320 of acquiring, displaying, and undisplaying a still image may be omitted.

In this manner, the process of disabling and enabling the input device 16 is ended. With such control, because the power consumed by the input device 16 can be reduced, further power saving can be achieved in the electronic device 10.

The technology for changing the size of the window, the technology for using a still image, the technology for adjusting the luminance of the display 11, and the technology for disabling and enabling the input device 16 described above may be combined in any way. For example, the power saving processing and the restoring processing combining all these techniques are illustrated in each of FIGS. 11A and 11B. Note that the order of these steps illustrated in FIGS. 11A and 11B is merely an example, and is not limited thereto.

Figure 11A:
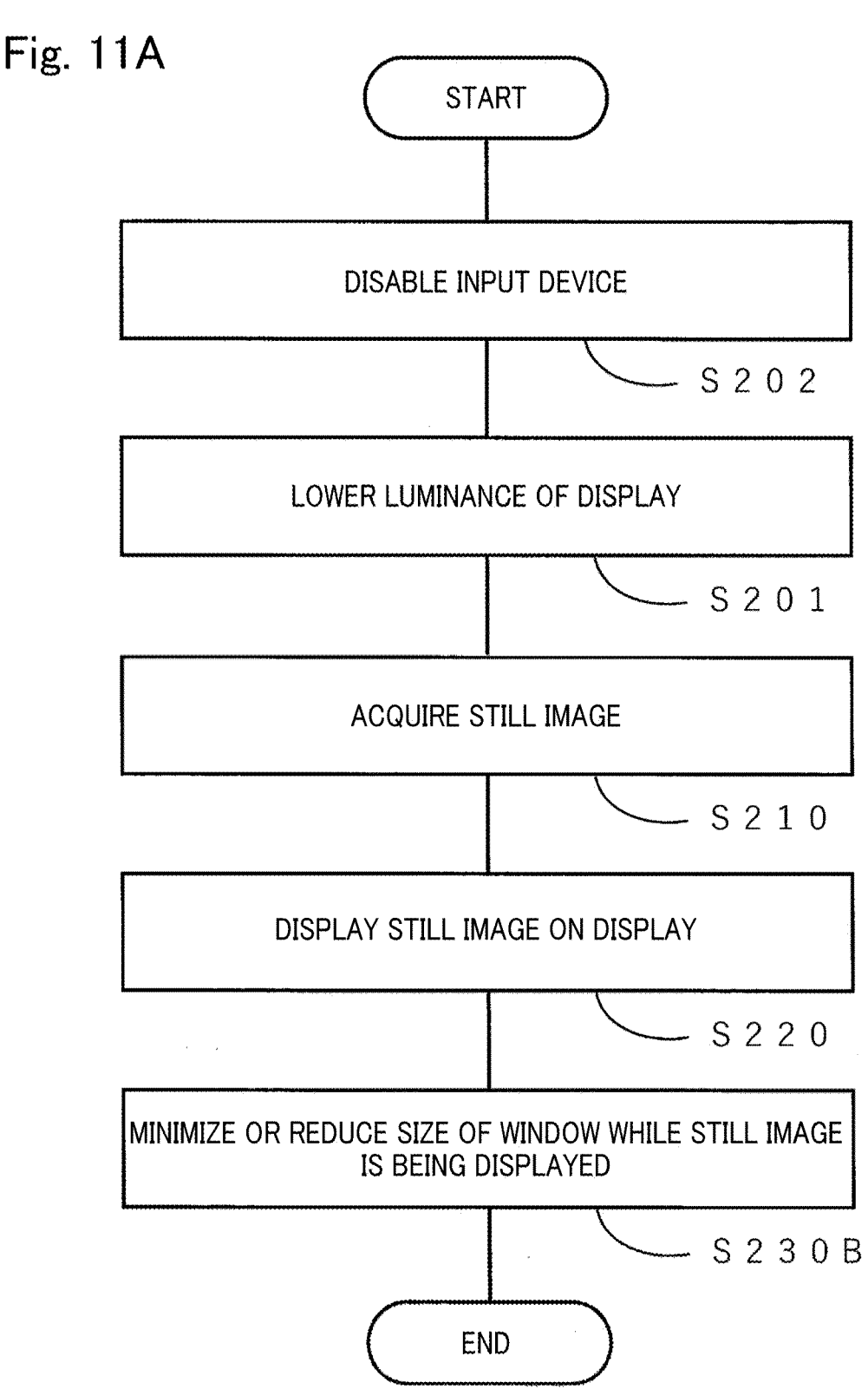
FIG. 11A is a flowchart of another example of the power saving processing in the fifth embodiment.

In the power saving processing illustrated in FIG. 11A, the controller 12 disables the input device 16 (step S202) and lowers the luminance of the display 11 (step S201). The controller 12 then acquires a still image (step S210), and displays the still image on the display 11 (step S220). While the still image is being displayed, the controller 12 minimizes or reduces the size of the window (step S230B).

Figure 11B:
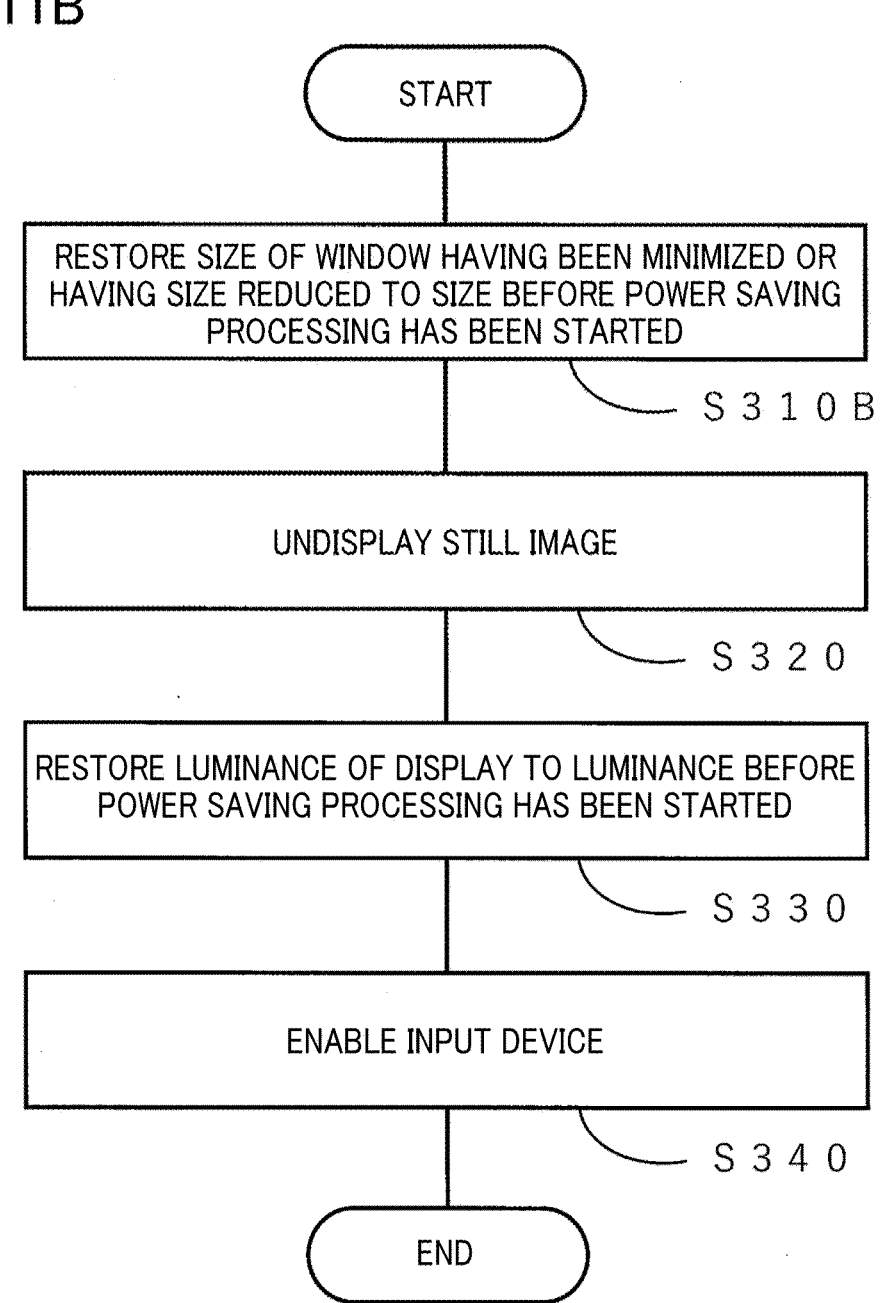
FIG. 11B is a flowchart illustrating another example of the restoring processing in the fifth embodiment.

In the restoring processing illustrated in FIG. 11B, the controller 12 may restore the size of the window having been minimized or reduced, to the size before the power saving processing has been started (step S310B). The controller 12 then undisplays the still image (step S320), restores the luminance of the display 11 (step S330), and enables the input device 16 (step S340).

By combining various power saving technologies in the manner described above, further power saving can be achieved in the electronic device 10. Furthermore, by displaying a still image, flickering at the time of changing the size of the window can be suppressed, and the usability of the electronic device 10 can be improved.

Note that the present disclosure also provides a computer program and a storage medium for a control method for electronic device 10 corresponding to the second to the fifth embodiments.

The foregoing is merely specific embodiments of the present disclosure, and the scope protected by the present disclosure is not limited thereto. The present disclosure includes specific details depicted in the drawings and the specific embodiments described above, but the present disclosure is not limited thereto. The various embodiments or examples disclosed above may be combined without departing from the scope or spirit of the disclosure. Changes not departing from the functional and structural principles of the present disclosure fall within the scope of the claims.

What is claimed is:

1. An electronic device comprising:
a display that displays at least one window of at least one application;
a controller that controls the display; and
an input device that receives a command from a user, wherein
the controller:
acquires first trigger information for starting power saving processing;
starts the power saving processing based on the first trigger information;
acquires second trigger information for canceling the power saving processing; and starts restoring processing for cancelling the power saving processing based on the second trigger information,
the controller further, in the power saving processing:
disables the input device;
acquires a still image based on a screen of the display;
displays the still image on top of the at least one window on the screen of the display after disabling the input device; and
minimizes a size of the at least one window behind the still image while the still image is being displayed on top, and
the controller further, in the restoring processing:
restores the minimized window behind the still image to the size before the power saving processing has been started;
undisplays the still image after restoring the minimized window behind the still image; and
enables the input device after undisplaying the still image.

2. The electronic device according to claim 1, wherein the first trigger information is information indicating that a line of sight of the user is not directed to the display, the user is not in front of the display, or the user has entered a specific command.

3. The electronic device according to claim 2, wherein the second trigger information indicating that the line of sight of the user is directed to the display, or the user is in front of the display.

4. The electronic device according to claim 3, wherein
the controller further, in the power saving processing, lowers luminance of the display before displaying the still image on the display, and
the controller further, in the restoring processing, restores the luminance of the display to the luminance before the power saving processing has been started, after undisplaying of the still image.

5. The electronic device according to claim 3, wherein the still image is one of a screenshot captured before minimizing the size of the at least one window, an image obtained by blurring the screenshot, or an image stored in advance.

6. The electronic device according to claim 1, wherein the application is either:
an application that performs image processing in real time; or
an application having a configuration consuming less power during execution with the window minimized, than a predetermined threshold for a power consumption during execution without the window minimized.

7. An electronic device comprising:
a display that displays at least one window of at least one application;
an input device that receives a command from a user; and
a controller that controls the display, wherein
the controller:
acquires first trigger information for starting power saving processing;
starts the power saving processing based on the first trigger information;
acquires second trigger information for canceling the power saving processing; and
starts restoring processing for cancelling the power saving processing based on the second trigger information,
the controller further, in the power saving processing:
disables the input device;
acquires a still image based on a screen of the display;

displays the still image on top of the at least one window on the screen of the display after disabling the input device; and reduces a size of the at least one window behind the still image while the still image is being displayed on top, and the controller further, in the restoring processing:

restores the size of the reduced window behind the still image to the size before the power saving processing has been started;

undisplays the still image after restoring the size of the reduced window behind the still image; and enables the input device after undisplaying the still image.

8. The electronic device according to claim 7, wherein the first trigger information is information indicating that a line of sight of the user is not directed to the display, the user is not in front of the display, or the user has entered a specific command.

9. The electronic device according to claim 8, wherein the second trigger information indicating that the line of sight of the user is directed to the display, or the user is in front of the display.

10. The electronic device according to claim 9, wherein the controller further, in the power saving processing, lowers luminance of the display before displaying the still image on the display, and the controller further, in the restoring processing, restores the luminance of the display to the luminance before the power saving processing has been started, after undisplaying of the still image.

11. The electronic device according to claim 9, wherein the still image is one of a screenshot captured before reducing the size of the at least one window, an image obtained by blurring the screenshot, or an image stored in advance.

12. A control method for an electronic device comprising steps of:

acquiring first trigger information for starting power saving processing;

starting the power saving processing based on the acquired first trigger information;

acquiring second trigger information for canceling the power saving processing; and starting restoring processing for cancelling the power saving processing based on the second trigger information, wherein the power saving processing includes steps of:

disabling an input device of the electronic device;

acquiring a still image based on a screen of a display of the electronic device;

displaying the still image on top of the at least one window on the screen of the display after disabling the input device; and minimizing a size of at least one window of at least one application behind the still image while the still image is being displayed on top, and the restoring processing includes steps of:

restoring the minimized window behind the still image to the size before the power saving processing has been started;

undisplaying the still image after restoring the minimized window behind the still image; and enabling the input device after undisplaying the still image.

13. The control method according to claim 12, wherein the first trigger information is information indicating that a line of sight of the user is not directed to the display, the user is not in front of the display, or the user has entered a specific command.

14. The control method according to claim 13, wherein the second trigger information indicating that the line of sight of the user is directed to the display, or the user is in front of the display.

15. The control method according to claim 14, wherein the power saving processing further includes a step of lowering luminance of the display before displaying the still image on the display, and the restoring processing includes a step of restoring the luminance of the display to the luminance before the power saving processing has been started, after undisplaying of the still image.

16. The control method according to claim 14, wherein the still image is one of a screenshot captured before minimizing the size of the at least one window, an image obtained by blurring the screenshot, or an image stored in advance.

17. The control method according to claim 12, wherein the still image is one of a screenshot captured before minimizing the size of the at least one window, an image obtained by blurring the screenshot, or an image stored in advance, and the application is either:

an application that performs image processing in real time; or an application having a configuration consuming less power during execution with the window minimized, than a predetermined threshold for a power consumption during execution without the window minimized.

18. The control method according to claim 12, wherein the application is either:

an application that performs image processing in real time; or an application having a configuration consuming less power during execution with the window minimized, than a predetermined threshold for a power consumption during execution without the window minimized.

19. A non-transitory computer readable storage medium storing therein a computer program, wherein the non-transitory computer readable storage medium implements the control method according to claim 12 when the computer program is executed by a processor.

* * * * *